(12) United States Patent
Sabe et al.

(10) Patent No.: US 7,849,033 B2
(45) Date of Patent: Dec. 7, 2010

(54) LEARNING CONTROL APPARATUS, LEARNING CONTROL METHOD, AND COMPUTER PROGRAM

(75) Inventors: Kohtaro Sabe, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 11/350,048

(22) Filed: Feb. 9, 2006

(65) Prior Publication Data

US 2006/0195409 A1    Aug. 31, 2006

(30) Foreign Application Priority Data

Feb. 23, 2005  (JP)  ............................. 2005-046966
Jun. 9, 2005   (JP)  ............................. 2005-169456

(51) Int. Cl.
  *G06F 15/18*  (2006.01)
  *G06N 3/08*   (2006.01)
(52) U.S. Cl. ............................. 706/25; 706/23; 706/21
(58) Field of Classification Search .................. 706/25, 706/23, 21; 700/44, 28
  See application file for complete search history.

(56) References Cited

U.S. PATENT DOCUMENTS

| | | | |
|---|---|---|---|
| 5,347,446 A |   | 9/1994 | Iino et al. |
| 5,671,334 A | * | 9/1997 | Lynne ............................ 706/23 |
| 6,185,470 B1 | * | 2/2001 | Pado et al. ................... 700/104 |
| 6,633,858 B2 | * | 10/2003 | Yamakawa et al. ............ 706/16 |

OTHER PUBLICATIONS

Tani, Jun, "Model-Based Learning for Mobile Robot Navigation from the Dynamical System Perspective", IEEE, 1996.*
Jun Nakanishi, et al., "Learning Composite Adaptive Control for a Class of Nonlinear Systems", Proceedings of the 2004 IEEE, XP010768518, vol. 3, Apr. 2004, pp. 2647-2652.
Jun Morimoto, et al., "Acquisition of stand-up behavior by a real robot using hierarchical reinforcement learning", Robotics and Autonomous Systems, XP004250784, vol. 36, No. 1, 2001, pp. 37-51.
U.S. Appl. No. 11/350,825, filed Feb. 10, 2006, Sabe et al.
U.S. Appl. No. 11/350,048, filed Feb. 9, 2006, Sabe et al.

* cited by examiner

*Primary Examiner*—Michael B. Holmes
*Assistant Examiner*—Adrian L Kennedy
(74) *Attorney, Agent, or Firm*—Oblon, Spivak, McClelland, Maier & Neustadt, L.L.P.

(57) ABSTRACT

A learning control apparatus for controlling a learning operation of an apparatus sensing a state of an environment and selecting a behavior based on the sensed content, includes a predictor for learning the behavior and a change in the state of the environment, and predicting a change in the state of the environment in response to a predetermined behavior, a goal state setting unit for setting a goal state in the behavior, a planner for planning a behavior sequence from a current state to the goal state set by the goal state setting unit based on a prediction of the predictor, and a controller for controlling the behavior in the behavior sequence planned by the planning unit and learning an input and output relationship in the behavior.

12 Claims, 28 Drawing Sheets

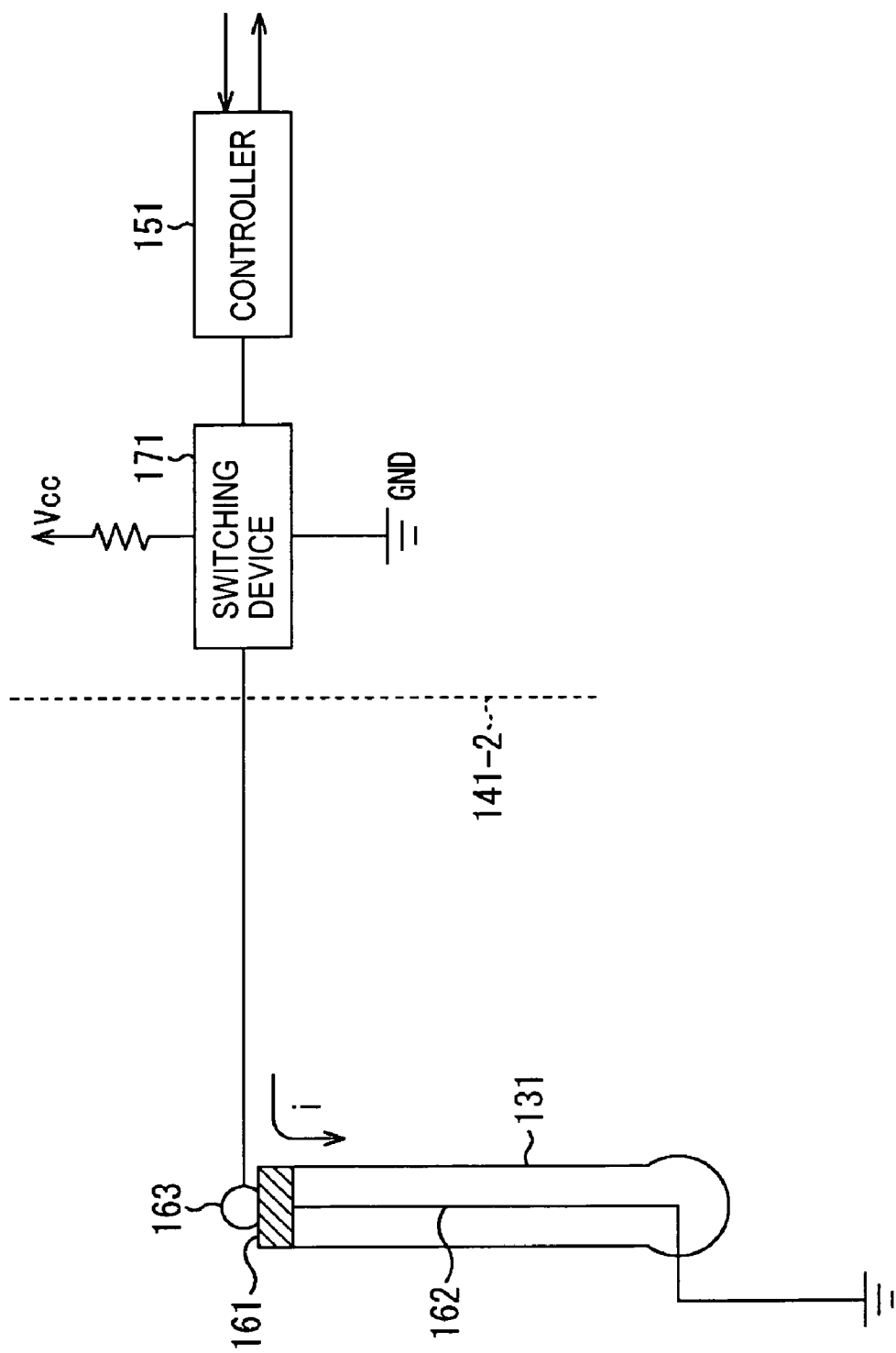

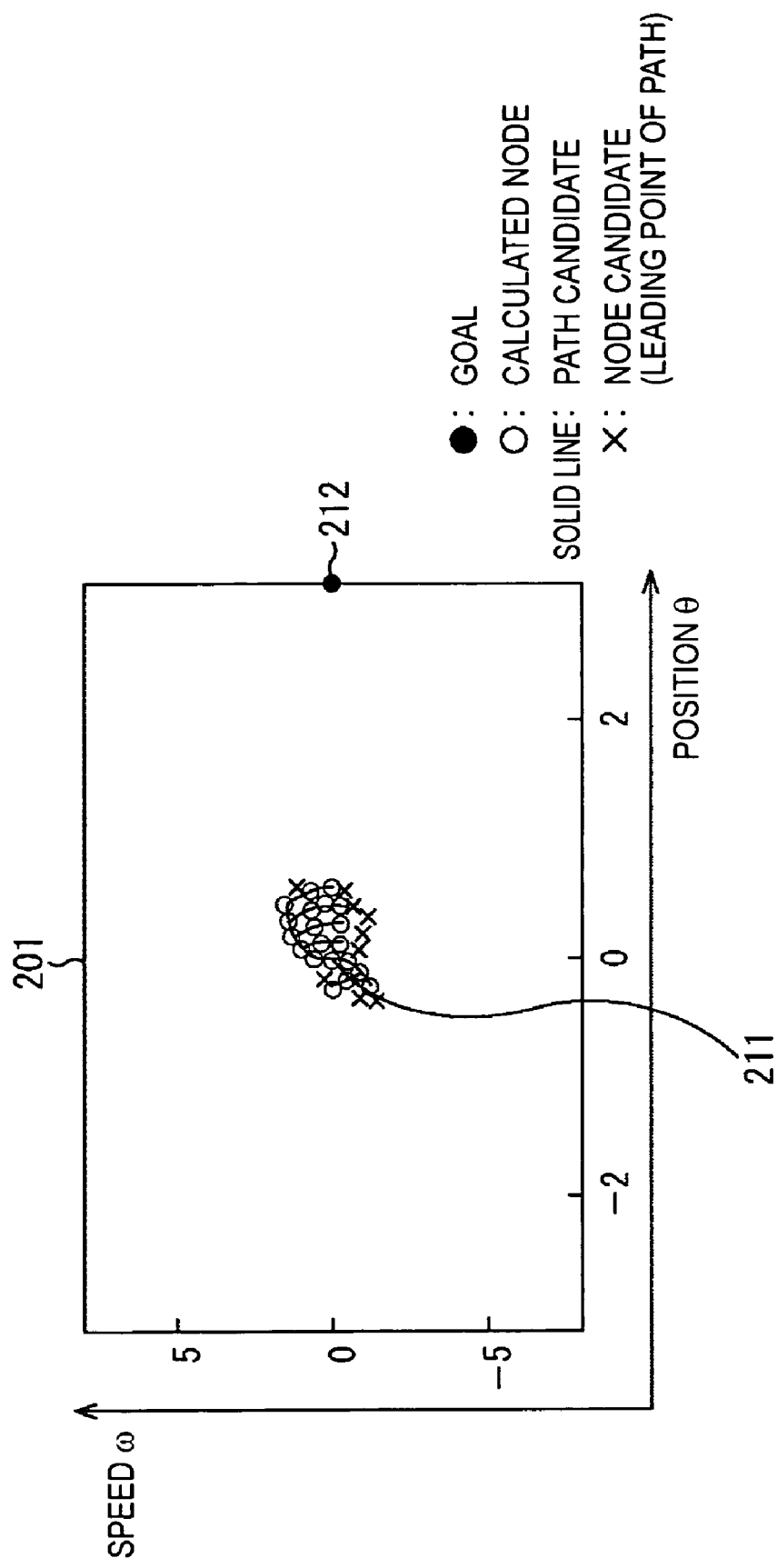

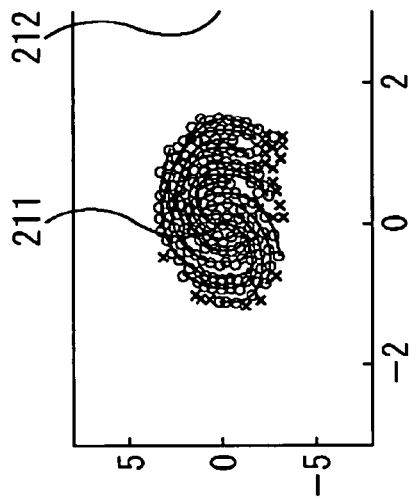
FIG. 9A  FIG. 9B  FIG. 9C
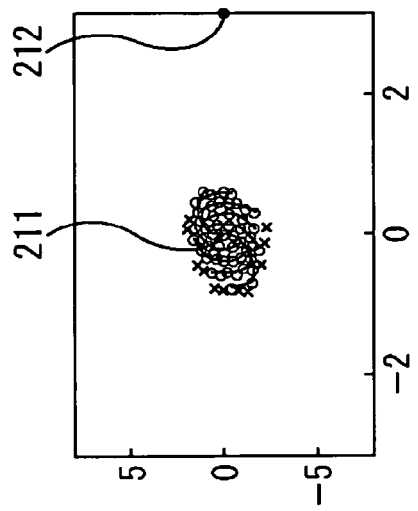
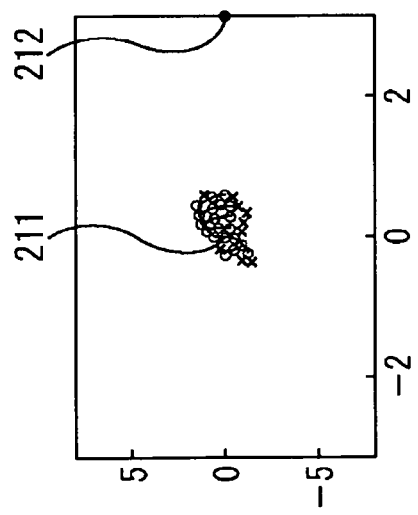
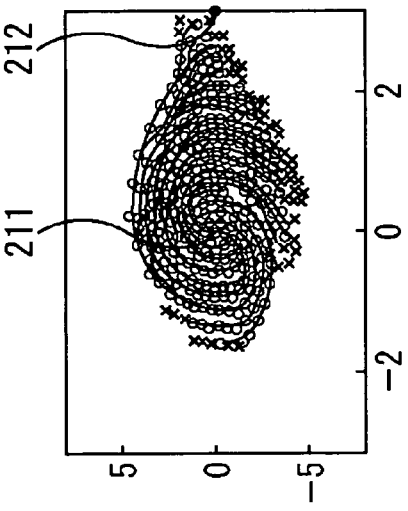
FIG. 9D
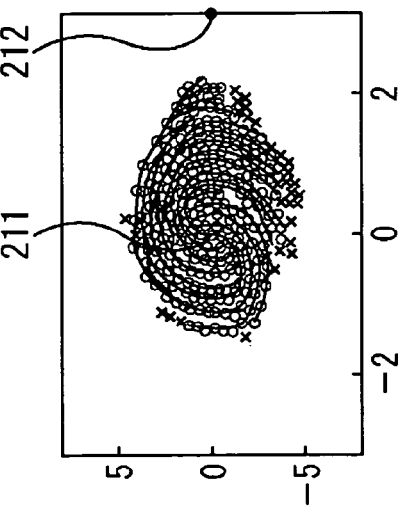
FIG. 9E

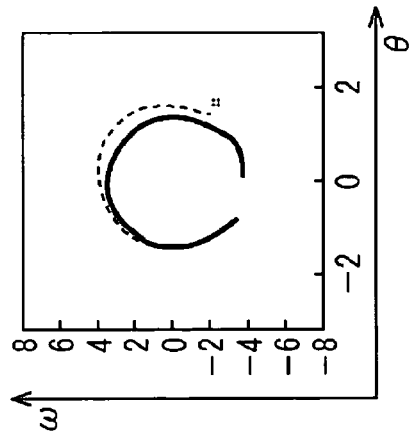
FIG. 10C TRIAL 3
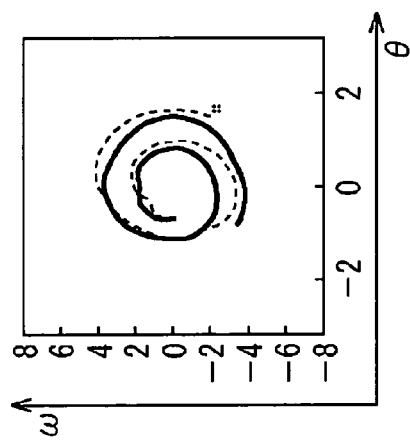
FIG. 10B TRIAL 2
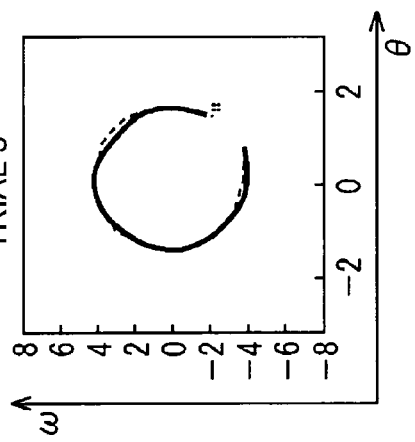
FIG. 10E TRIAL 5
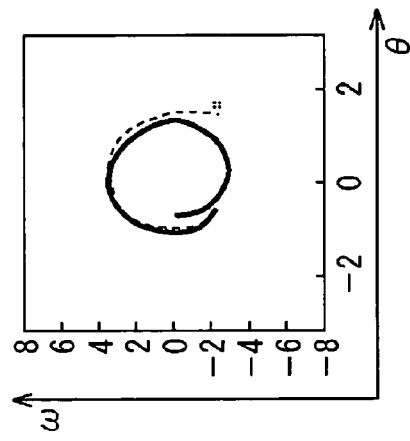
FIG. 10A TRIAL 1
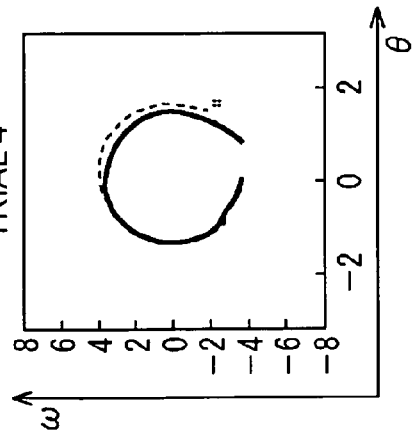
FIG. 10D TRIAL 4

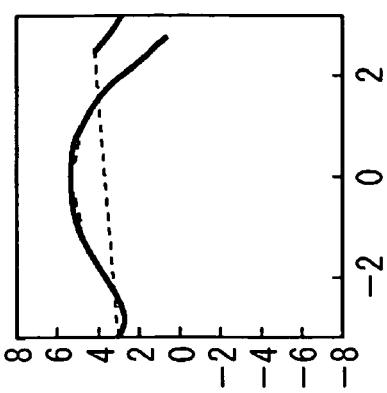
FIG. 12C SUCCESS SEQUENCE 3
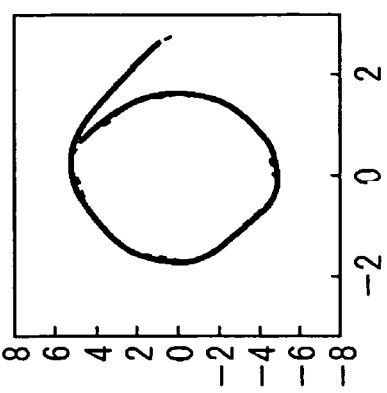
FIG. 12E SUCCESS SEQUENCE 10
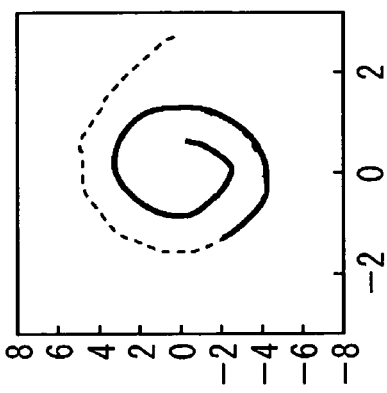
FIG. 12B SUCCESS SEQUENCE 2
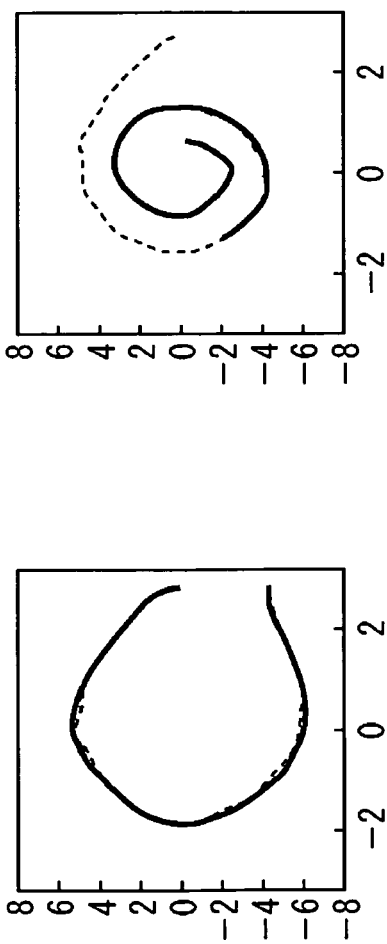
FIG. 12A SUCCESS SEQUENCE 1
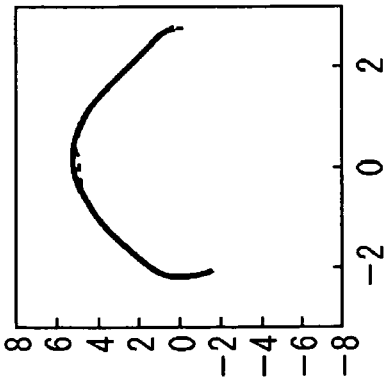
FIG. 12D SUCCESS SEQUENCE 4

- EVALUATION INDEX (PLAN ACHIEVEMENT)
  — SUMMING ERROR
    $$S_1 = \sum_{t}^{N} |x_{goal} - x(t)_{plan}|$$
  — MINIMUM DISTANCE TO GOAL
  — ESTIMATED TIME TO GOAL
- IMPOSSIBLE TO DISTINGUISH BETWEEN DIFFICULTY OF TASK (GOAL) AND DIFFICULTY OF VARIABLE

|  | INSUFFICIENT EXPERIENCE | PROBLEM DIFFICULT | INSUFFICIENT SKILL | PROBLEM SOLVED |
|---|---|---|---|---|
| PREDICTION | × | ○ | ○ | ○ |
| PLAN | × | × | ○ | ○ |
| CONTROL | × | × | × | ○ |

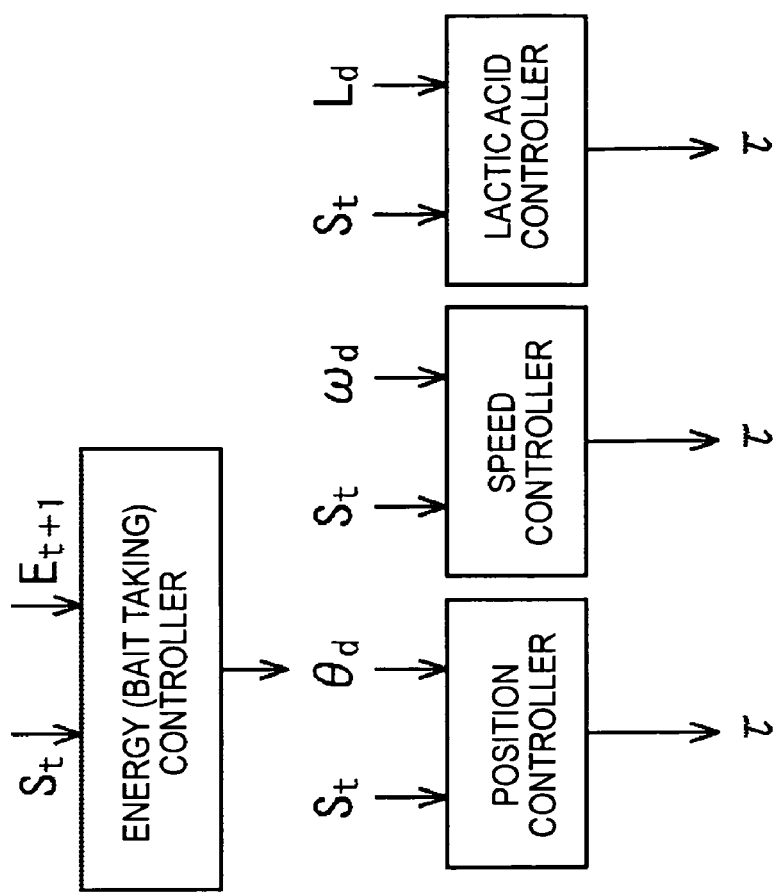

FIG. 26

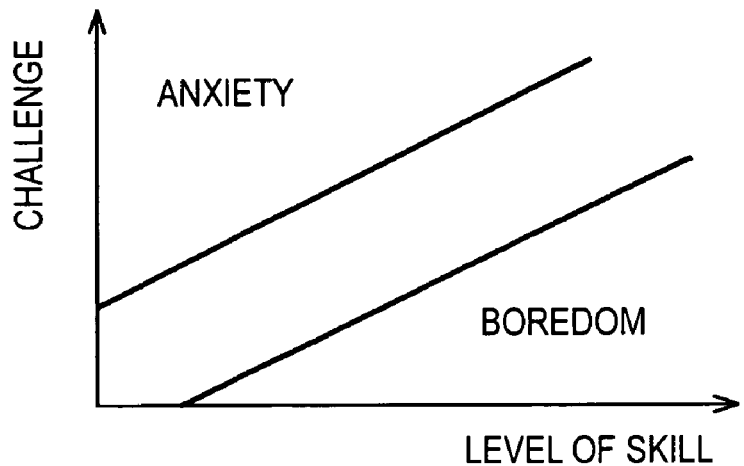

FIG. 27

- HOMEOSTASIS FUNCTION SET FOR PARTICULAR VARIABLE
    - ENERGY: 1.0-E → LARGE: UNCOMFORTABLE
                      SMALL: COMFORTABLE
    - LACTIC ACID: L → LARGE: UNCOMFORTABLE
                      SMALL: COMFORTABLE
- OUTPUT OF HOMEOSTASIS FUNCTION IS LINKED TO OCCURRENCE PROBABILITY OF MOTIVE
    - DISCOMFORT INDEX → HIGH PROBABILITY
    - SOFTMAX IS SELECTED WITH INTRINSIC MOTIVE AT HOMEOSTASIS OF 0.7
- SET HOMEOSTASIS FUNCTION = 0.0 (COMFORTABLE STATE) AS GOAL
- BEHAVIOR IS DETERMINED WITH CONDITIONS OTHER THAN THE ABOVE CONDITIONS TREATED IN THE SAME WAY AS OTHER VARIABLES

LEARNING CONTROL APPARATUS, LEARNING CONTROL METHOD, AND COMPUTER PROGRAM

CROSS REFERENCES TO RELATED APPLICATIONS

The present invention contains subject matter related to Japanese Patent Application JP 2005-046966 filed in the Japanese Patent Office on Feb. 23, 2005, and Japanese Patent Application JP 2005-169456 filed in the Japanese Patent Office on Jun. 9, 2005, the entire contents of which are incorporated herein by reference.

BACKGROUND OF THE INVENTION

1. Field of the Invention

The present invention relates to a learning control apparatus, a learning control method, and a computer program. More specifically, the present invention relates to a learning control apparatus, a learning control method, and a computer program for causing an autonomous agent to select a target task on its own, to perform a learning process by making a plan to achieve a goal state and by executing the plan, and then to expand successively capability of the autonomous agent.

2. Description of the Related Art

In known behavioral learning, input and output variables to a learner are manually selected taking into consideration tasks to be solved and expected behaviors as disclosed by Richard S. Sutton and Andrew G. Barto in the book entitled "Reinforcement Learning" MIT Press (1998), and by J. Tani in the paper entitled "Model-based learning for mobile robot navigation from the dynamical systems perspective" IEEE Trans. on Systems, Man, and Cybernetics part B: Cybernetics, Vol. 26, No. 3, pp. 421-436, 1996.

In view of multi-freedom autonomous robots, however, determining task and input and output variables in design stage means limiting a learning capability of a robot from the design stage. If a reward function serving as a goal is imparted by human, an agent can only solve the corresponding problem. The known method is thus subject to serious problem in the designing of an open-ended autonomous robot.

In one contemplated scenario, an autonomous agent is forced to continue to improve learning toward an unachievable goal by selecting, as the goal, a reward function that is difficult to achieve. With the technique of reinforcement learning, learning approaching the goal cannot be continued without giving any single reward.

To overcome this problem, another technique is disclosed by J. Morimoto and K. Doya in the paper entitled "Acquisition of stand-up behavior by a real robot using hierarchical reinforcement learning", Robotics and Autonomous Systems, 36, 37-51 (2001). In the disclosed technique, a sub-goal is set up in addition to a reward function serving as a final goal, a hierarchical structure is constructed, and a controller is caused to perform reinforcement learning with an objective set to cause a hierarchically lower module to solve the sub-goal. The controller causes a hierarchically higher module to learn a goal switching control rule to achieve the goal.

SUMMARY OF THE INVENTION

Even in the technique disclosed by J. Morimoto and K. Doya, the setup of the sub-goal still depends on task. The disclosed technique falls within the field of a learning machine for a particular task.

With the knowledge of psychology that focuses on the analysis of human behavior and sounding the action of the mind, behaviors, such as self-preservation and self-replication, which cannot be explained based on extrinsic motive, are classified as actions based on intrinsic motive. Behaviors based on the intrinsic motive include behaviors apparently contradictory to the principle of self-preservation, such as a behavior of a talented painter who is devotedly painting a picture, that could be a masterpiece, and a behavior of a rock climber who challenges a rockface even risking his own life.

The intrinsic motives include inquisitive motive, manipulatory motive, achievement motive, sensory motive, etc. Inquisitive motive, manipulatory motive, and achievement motive, sensory motive are respectively explained as based on a desire for searching for an unexperienced event, satisfaction obtained by manipulating an object with complete control, pleasure obtained by achieving a set objective, and a desire for a stimulant greatly changing from a preceding stimulant.

In the flow theory proposed by Mihaly Csikszentmihalyi in the book entitled "Beyond Boredom and Anxiety; Experiencing flow in work and play", 1975, an expansion of skill of one is immediately fed back to cause a flow in a task where the skill of the one is balanced with the difficulty of a goal, and the one indulges oneself in that task.

The classification and structure of the motives in psychology are used to attempt to explain a universal behavior principle common to humans rather than intended to be applied to a particular task. By implementing psychological behavioral rule into learning of an autonomous agent, the autonomous agent not only may solve a particular task set for humans, but also may solve a variety of tasks set by the autonomous agent itself in the learning process.

It is thus desirable to provide an autonomous agent that selects a target task on its own using the knowledge of psychology rather than simply solving a particular task, performs learning process, and expands successively capability of the autonomous agent.

A learning control apparatus of one embodiment of the present invention includes a predicting unit for learning the behavior and a change in the state of the environment, and predicting a change in the state of the environment in response to a predetermined behavior, a goal state setting unit for setting a goal state in the behavior, a planning unit for planning a behavior sequence from a current state to the goal state set by the goal state setting means based on a prediction of the predicting means, and a control unit for controlling the behavior in the behavior sequence planned by the planning unit and learning an input and output relationship in the behavior. The predicting unit calculates first information relating to an prediction accuracy based on learning, and supplies the first information to the goal state setting unit. The planning unit calculates second information corresponding to an index that indicates whether the behavior based on the behavior sequence controlled by the control unit comes close to the goal state, and supplies the second information to the goal state setting unit. The control unit calculates third information relating to a progress of learning of the input and output relationship, and supplies the third information to the goal state setting unit. The goal state setting unit sets the goal state based on the first information, the second information, and the third information.

The goal state setting unit may modify the goal state based on the first information, the second information and the third information if none of the accuracy of the prediction calculated by the predicting unit, the index calculated by the planning unit, and the progress of the learning calculated by the control unit shows any improvement.

The goal state setting unit may modify the goal state based on the first information, the second information and the third information if all of the accuracy of the prediction calculated by the predicting unit, the index calculated by the planning unit, and the progress of the learning calculated by the control unit are sufficient.

The goal state setting unit may select at least one of variables indicating the state of the environment, set a predetermined numerical value condition at the selected variable, and if the selected variable fails to satisfy the predetermined numerical value condition in the state of the environment, set a goal state in which the selected variable satisfies the predetermined numerical condition.

The planning unit may notify the goal state setting unit that the planning unit has failed to plan the behavior sequence if the planning unit has failed to plan the behavior sequence based on the prediction of the predicting unit, and the goal state setting unit may modify the goal state if the goal state setting unit has received the notification from the planning unit that the planning of the behavior sequence has failed.

If the goal state has been reached through the behavior based on the behavior sequence planned by the planning unit, the control unit may learn the input and output relationship in the behavior.

If the goal state has not been reached through the behavior based on the behavior sequence planned by the planning unit, the control unit may learn the input and output relationship in the behavior with a reached state replaced with the goal state.

The planning unit may plan the behavior sequence, the behavior sequence selecting a second variable having a high correlation with a first variable indicating the goal state set by the goal state setting means, and the behavior sequence reaching the goal state by controlling the selected second variable.

A learning control method of one embodiment of the present invention includes a predicting learning step of learning the behavior and a change in the state of the environment, a goal state setting step of setting a goal state in the behavior, a planning step of planning a behavior sequence from a current state to the goal state set in the goal state setting step using a prediction based on learning in the predicting learning step, a behavior control step of controlling the behavior in the behavior sequence planned in the planning step, a control learning step of learning an input and output relationship between the behavior controlled in the behavior control step and the environment corresponding to the behavior, a calculating step of calculating first information relating to an prediction accuracy based on learning in the predicting learning step, second information corresponding to an index that indicates whether the behavior based on the behavior sequence controlled in the behavior control step comes close to the goal state, and third information relating to a progress of learning of the input and output relationship, and a determining step of determining, based on the first information, the second information, and the third information calculated in the calculating step whether the goal state is to be set again or not.

A computer program of one embodiment of the present invention includes a predicting learning step of learning the behavior and a change in the state of the environment, a goal state setting step of setting a goal state in the behavior, a planning step of planning a behavior sequence from a current state to the goal state set in the goal state setting step using a prediction based on learning in the predicting learning step, a behavior control step of controlling the behavior in the behavior sequence planned in the planning step, a control learning step of learning an input and output relationship between the behavior controlled in the behavior control step and the environment corresponding to the behavior, a calculating step of calculating first information relating to an prediction accuracy based on learning in the predicting learning step, second information corresponding to an index that indicates whether the behavior based on the behavior sequence controlled in the behavior control step comes close to the goal state, and third information relating to a progress of learning of the input and output relationship, and a determining step of determining, based on the first information, the second information, and the third information calculated in the calculating step, whether the goal state is to be set again or not.

In accordance with embodiments of the present invention, the behavior and the change in the state of the environment are learned. A behavior and a change in the state of the environment are predicted based on the learning results. The goal state of the behavior is set. The behavior sequence from the current state to the goal state is planned based on the prediction. The behavior is controlled in accordance with the planned behavior sequence. The input and output relationship between the behavior and the corresponding environment is learned. The first information relating to the prediction accuracy based on predicting learning is calculated. The second information corresponding to the index indicating whether the behavior based on the behavior sequence comes close to the goal state is calculated. The third information relating to the progress of the learning of the input and output relationship is calculated. Whether to set the goal state again or not is determined based on the first through third information.

In accordance with embodiments of the present invention, learning is performed to control the behavior. A target task is selected to expand capability of the autonomous agent without standing still in learning.

BRIEF DESCRIPTION OF THE DRAWINGS

FIG. 7 is a block diagram illustrating a different controller controlling the autonomous agent having the arm of FIG. 3;

FIG. 8 illustrates an iteration of planning and execution;

FIGS. 9A-9E illustrate an iteration of planning and execution;

FIGS. 10A-10E illustrate sequences that allow a goal state to be reached through the iteration of planning and execution;

FIGS. 12A-12E illustrate a successful sequence to the goal state from a plurality of states provided as a learning sample;

FIGS. 25A and 25B illustrate an embodied image of a pendulum agent;

FIG. 26 illustrates flow theory;

FIG. 27 illustrates a combination with extrinsic motives;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
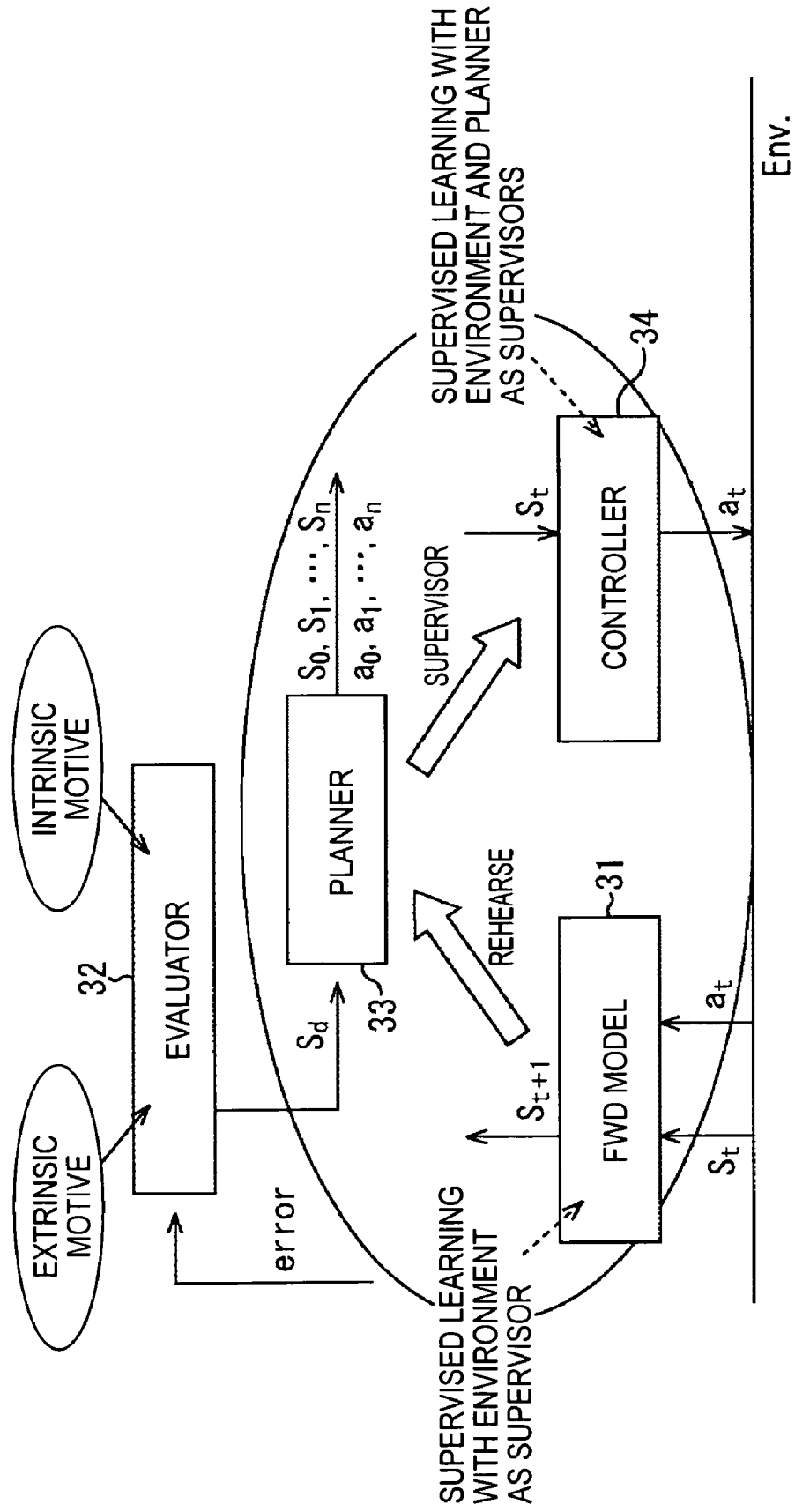
FIG. 1 illustrates a basic configuration of an autonomous behavior control model.

A learning control apparatus (for example, a controller 151 of FIG. 6) of one embodiment of the present invention for controlling a learning operation of an apparatus sensing a state of an environment and selecting a behavior based on the sensed content, includes a predicting unit (for example, a predictor (fwd model) 31 of FIG. 1) for learning the behavior and a change in the state of the environment, and predicting a change in the state of the environment in response to a predetermined behavior, a goal state setting unit (for example, an evaluator 32 of FIG. 2) for setting a goal state in the behavior, a planning unit (for example, a planner 33 of FIG. 1) for planning a behavior sequence from a current state to the goal state set by the goal state setting unit based on a prediction of the predicting unit, and a control unit (for example, a controller 34) for controlling the behavior in the behavior sequence planned by the planning unit and learning an input and output relationship in the behavior. The predicting unit calculates first information (for example, a predictive error) relating to an prediction accuracy based on learning, and supplies the first information to the goal state setting unit. The planning unit calculates second information (for example, one of goal achievement and planning error) corresponding to an index that indicates whether the behavior based on the behavior sequence controlled by the control unit comes close to the goal state, and supplies the second information to the goal state setting unit. The control unit calculates third information (for example, a control error) relating to a progress of learning of the input and output relationship, and supplies the third information to the goal state setting unit. The goal state setting unit sets the goal state based on the first information, the second information, and the third information.

The goal state setting unit may modify the goal state based on the first information, the second information and the third information if none of the accuracy of the prediction calculated by the predicting unit, the index calculated by the planning unit, and the progress of the learning calculated by the control unit shows any improvement (for example, in the state of "anxiety" in the flow theory).

The goal state setting unit may modify the goal state based on the first information, the second information and the third information if all of the accuracy of the prediction calculated by the predicting unit, the index calculated by the planning unit, and the progress of the learning calculated by the control unit are sufficient (for example, in the state of "boredom" in the flow theory).

The goal state setting unit may select at least one of variables indicating the state of the environment, set a predetermined numerical value condition (for example, a value set as "pleasure") at the selected variable (for example, one of energy level and lactic acid level), and if the selected variable fails to satisfy the predetermined numerical value condition in the state of the environment, set a goal state in which the selected variable satisfies the predetermined numerical condition.

The planning unit may notify the goal state setting unit that the planning unit has failed to plan the behavior sequence if the planning unit has failed to plan the behavior sequence based on the prediction of the predicting unit, and the goal state setting unit may modify the goal state if the goal state setting unit has received the notification from the planning unit that the planning of the behavior sequence has failed.

If the goal state has been reached through the behavior based on the behavior sequence planned by the planning unit, the control unit may learn the input and output relationship in the behavior.

If the goal state has not been reached through the behavior based on the behavior sequence planned by the planning unit, the control unit may learn the input and output relationship in the behavior with a reached state replaced with the goal state.

The planning unit may plan the behavior sequence, the behavior sequence selecting a second variable having a high correlation with a first variable indicating the goal state set by the goal state setting unit, and the behavior sequence reaching the goal state by controlling the selected second variable.

A learning control method of one embodiment of the present invention for controlling a learning operation of an apparatus sensing a state of an environment and selecting a behavior based on the sensed content, includes a predicting learning step (for example, one of step S9 of FIG. 28, step 37 of FIG. 31, and step S69 of FIG. 32) of learning the behavior and a change in the state of the environment, a goal state setting step (for example, one of step S4 of FIG. 28, step S33 of FIG. 31, and step S64 of FIG. 32) of setting a goal state in the behavior, a planning step (for example, one of step S5 of FIG. 28, step S34 of FIG. 31, and step S66 of FIG. 32) of planning a behavior sequence from a current state to the goal state set in the goal state setting step using a prediction based on learning in the predicting learning step, a behavior control step (for example, one of step S7 of FIG. 28, step S35 of FIG. 31, and step S67 of FIG. 32) of controlling the behavior in the behavior sequence planned in the planning step, a control learning step (for example, one of step S12 of FIG. 28, step S39 of FIG. 31, and step S71 of FIG. 32) of learning an input and output relationship between the behavior controlled in the behavior control step and the environment corresponding to the behavior, a calculating step (for example, one of step S13 of FIG. 28, step S40 of FIG. 31, and step S72 of FIG. 32) of calculating first information (for example, a predictive error) relating to an prediction accuracy based on learning in the predicting learning step, second information (for example, one of a goal achievement and an planning error) corresponding to an index that indicates whether the behavior based on the behavior sequence controlled in the behavior control step comes close to the goal state, and third information (a control error) relating to a progress of learning of the input and output relationship, and a determining step (for example, one of step S14 of FIG. 28, step S41 of FIG. 31, and step S75 of FIG. 32) of determining, based on the first information, the second information, and the third information calculated in the calculating step whether the goal state is to be set again or not.

A computer program of one embodiment of the present invention includes the same process steps as the above-referenced learning control method.

The embodiments of the present invention are described; below with reference to the drawings.

In the field of conventional robotics and artificial intelligence, heuristic approach has been used to generate a path or trajectory in the movement or action of whole or part of one of a mobile robot and an articulated robot. In such a heuristic approach, searching is performed taking into consideration a variety of options in behavior from the current state to a goal state to reach a solution. The heuristic approach has been successful. This field enjoys the advantage that kinematics and dynamics of a movement model and articulations of a robot are precisely known in advance. In this field, advanced computation techniques are available to determine efficiently a solution in an extremely large state space (work space) taking into consideration a posture of a robot.

In the field of pattern recognition, numerous algorithms of learning machines having a high generalization, such as support vector machine (SVM) or AdaBoost, have been proposed. These machines exhibit high performance in dealing inputs of a higher number of dimensions, such as an image and audio, and are being substituted for existing neural networks for pattern recognition.

To be free from the so-called curse of dimensionality (exponential growth with a function of dimensionality), the present invention is intended to generate a goal behavior sequence by using a pattern learner such as a SVM in learning of prediction and control, and by performing efficiently a heuristic search in a vast state space. Since a series of flow steps accounts for human thinking, humans can easily understand a behavior from outside, and a solution is reached within a practical length of time.

Generally, an "agent" refers to an autonomous agent that senses a state of an environment, and selects a behavior based on the sensed content.

FIG. 1 illustrates a basic configuration of an autonomous behavior control model controlling a behavior of an autonomous agent in accordance with a first embodiment of the present invention. The model of the first embodiment includes, as major portions thereof, four modules, i.e., a predictor (Fw Model) 31, an evaluator 32, a planner 33, and a controller 34. Env. stands for environment.

In accordance with the first embodiment of the present invention, improvements in the capability of each element (i.e., reduction in error) is considered as being implementation of an intrinsic motive, based on a fact that the functions of the predictor 31, the planner 33, and the controller 34 as elements of behavior control of an agent are similar to the classification of intrinsic motives. In the selection of tasks, the knowledge of the flow theory is incorporated in that whether to continue the task is determined based on the progress in capability improvement.

In known reinforcement learning, a particular task is assigned to an autonomous agent. In contrast, the autonomous agent itself finds and executes a task matching the capability thereof. Even after the task is completed, the autonomous agent continues the function thereof. Using a newly acquired capability (a controller 34 advancing in learning), the autonomous agent can thus set a task having a higher dimension that has never been solved before. The autonomous agent can thus learn a hierarchical structure of the controller 34.

The predictor 31 constantly performs predictive learning on the value to be taken by a sensor input $S_{t+1}$ at time (t+1) based on an action at taken by an autonomous agent at time t, and a sensor input $S_t$ (an environment encompassing the autonomous agent). In other words, the predictor 31 performs predictive learning with the environment being as a supervisor. The predictor 31 uses in learning a function approximator of statistical learning.

The evaluator 32 observes an error in prediction of the predictor 31, an error in planning of the planner 33, and an error in control of behavior of the controller 34, sets an achievement state in a sensory state space to be performed by the autonomous agent, and notifies the planner 33 of an achievement state as a goal (also referred to as a goal state).

The planner 33 plans a behavior sequence from a current state to the goal state provided by the evaluator 32. In planning, the predictor 31 predicts a transition of the state at the selected action. The action selection is then performed again. When a plan is generated toward the goal, the behavior sequence, i.e., one or a plurality of actions is successively performed.

The controller 34 performs a learning process with the plan of the planner 33 and the environment serving as supervisors, thereby controlling the action of the autonomous agent. If the action of the autonomous agent is successful, the controller 34 learns an input and output relationship, namely, a relationship between a sensor input indicative of the environment of the autonomous agent in a successful sequence executed to the given goal and the action performed to the sensor input.

If the plan has been successfully executed, the controller 34 learns, as an input for fixing a goal state, the input and output relationship between an observed state and a selected action. In this way, the controller 34 memorizes, as a pattern, the plan that the planner 33 has generated spending a substantial period of time. With gaining learning experience, the controller 34 automatically generates an action in response to a goal.

In learning, the controller 34 uses the function approximator of statistical learning.

Figure 2:
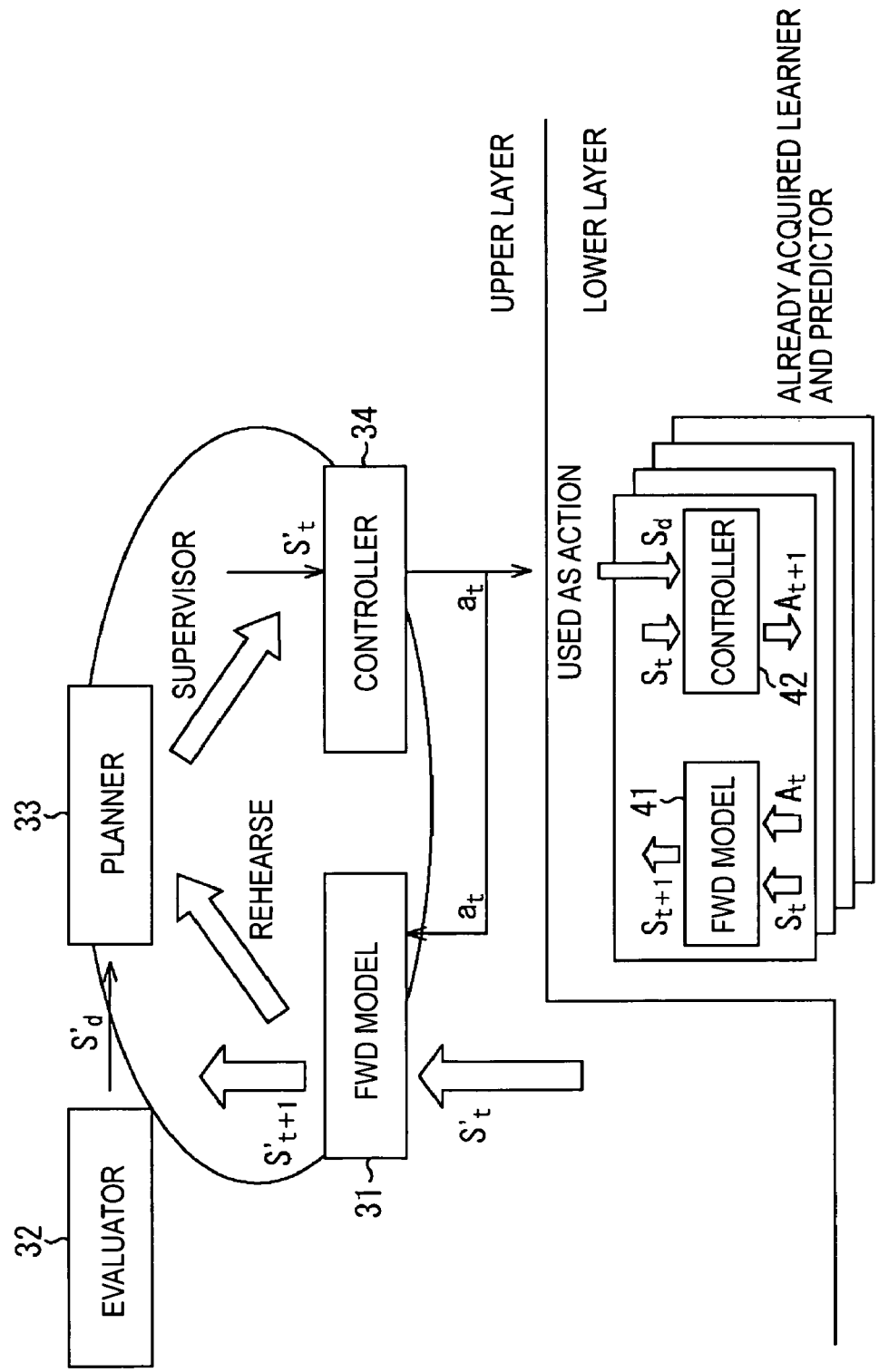
FIG. 2 illustrates a layering structure.

When the predictor 31 and the controller 34 gain sufficient learning experience, the goal state is hierarchically layered as a single action as shown in FIG. 2. At a hierarchically higher layer, the planner 33 generates a sequence for realizing a different goal state with a hierarchically lower layer as an action, thereby constructing a new predictor 41 and a new controller 42. Higher hierarchical higher and complex objects are thus successively controlled.

Figure 3:
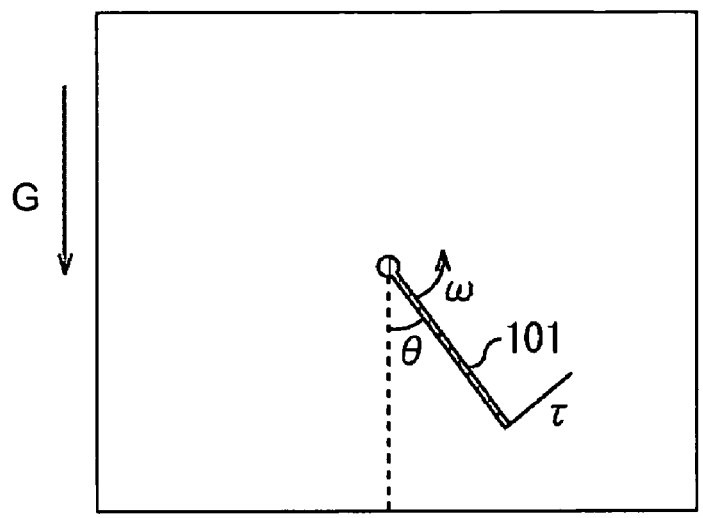
FIG. 3 illustrates an autonomous agent.

Sensing of the environment and the control of the behavior of the behavior control model discussed with reference to FIGS. 1 and 2 are described below. A simple robot as an autonomous agent is now considered. The robot has a link that is rotated with torque applied to a single joint thereof. FIG. 3 illustrates an autonomous agent 101.

The output of the autonomous agent 101 is torque (τ) applied to the joint. A present angle (θ) and a present angular velocity (ω) can be observed as inputs to the autonomous agent 101. Gravity (in the direction of θ=0°) is also present in the environment. The torque is relatively weaker than gravity. Even if a maximum torque is provided in one direction, the autonomous agent 101 is unable to tilt itself vertically to an upright position (at θ=π(180°)).

The autonomous agent 101 of FIG. 3 can be expanded to contain an internal state. For example, two parameters, i.e., energy level and lactic acid level are provided as internal states of the autonomous agent 101. Energy decreases in proportion to a given torque. When the autonomous agent 101 reaches one location (θE), energy is replenished and increased. Lactic acid increases in proportion to consumed energy, while being steadily decomposed by a small amount and decreased. If energy is fully consumed or if lactic acid is maximized, the autonomous agent 101 is unable to output torque.

Figure 4:
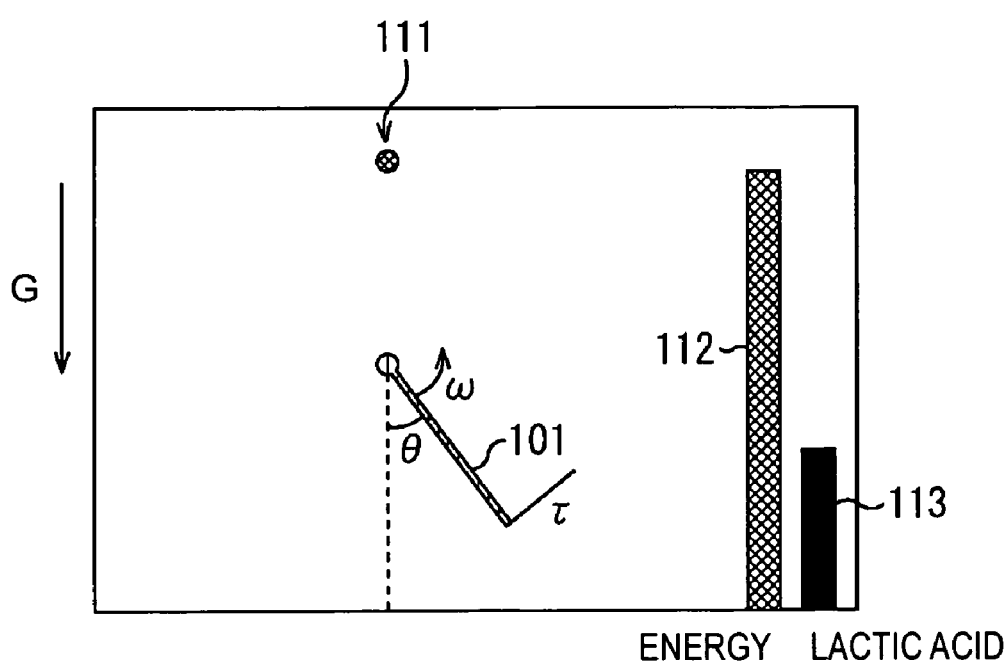
FIG. 4 illustrates an autonomous agent having an internal state.

FIG. 4 illustrates the autonomous agent 101 having the internal states thereof and a supply point of energy (bait). As shown in FIG. 4, energy (E) 112 and lactic acid (L) 113 are provided as the internal states of the autonomous agent 101. Bait 111 is set at a given location (θE).

A virtual and simplified agent is described as one embodiment of the present invention. The present invention is applicable to any agent as long as the agent acts on and senses the outside world.

Figure 5:
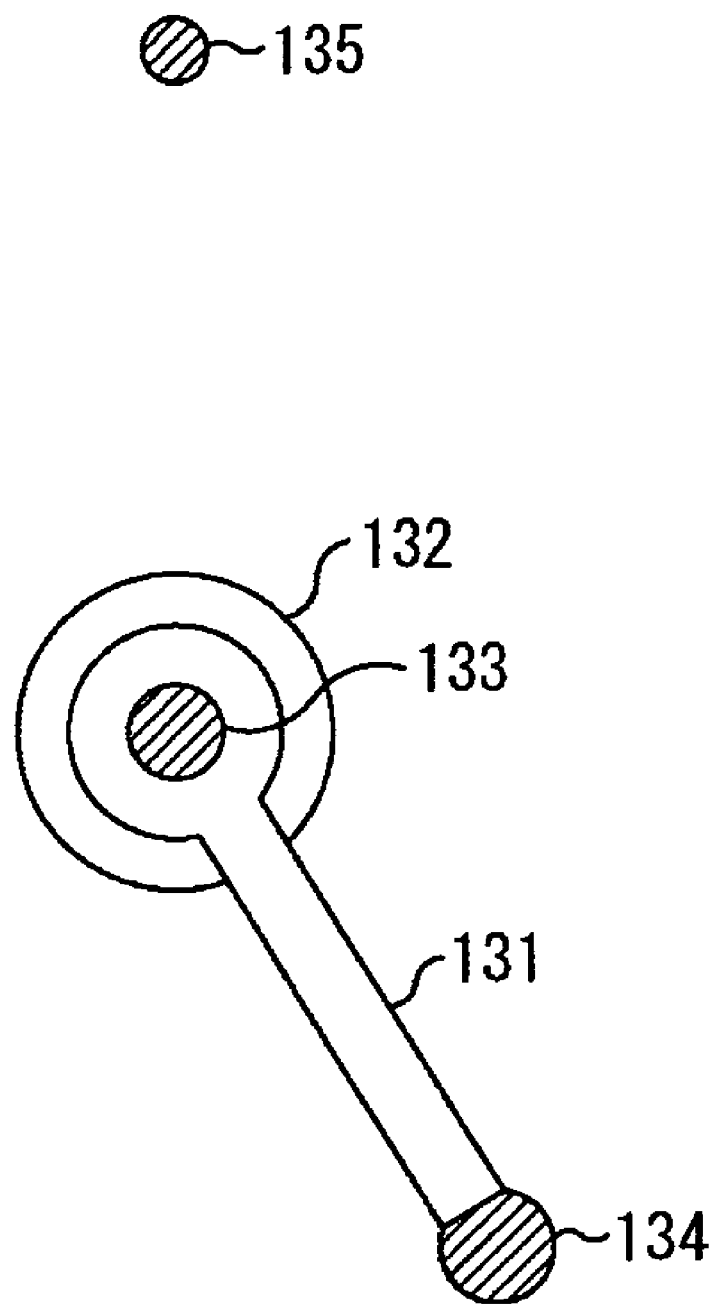
FIG. 5 illustrates a configuration of the autonomous agent of FIG. 2.

As shown in FIG. 5, the autonomous agent 101 discussed with reference to FIG. 4 behaves in response to torque applied in accordance with the plan and senses the environment.

The autonomous agent 101 has an arm 131 having a predetermined length. The arm 131 is rotated by an DC motor 132. The above-referenced torque is torque of the DC motor 132. An angle of rotation of the arm 131 is measured by a potentiometer 133. The arm 131 may is provided with a predetermined weight at the end thereof.

As previously discussed, the maximum torque of the DC motor 132 alone cannot turn upright the arm 131 (θ=180°). More specifically, the arm 131 is turned at an upright angle when an acceleration of the arm 131 at a predetermined angle caused by gravity and the torque imparted to the arm 131 by the DC motor 132 satisfy a predetermined condition.

The potentiometer 133 includes a variable resistor, for example, and varies the resistance thereof in response to the angle of the arm 131. The potentiometer 133 thus detects the angle of the arm 131.

The arm 131 has at the end thereof a light blocking section 134. When the light blocking section 134 reaches the location of a photosensor 135 arranged at a location corresponding to the bait 111, and has a speed of zero (i.e., θ=π and ω=0), no external light is incident on the photosensor 135. No external light detected by the photosensor 135 means that the autonomous agent 101 has reached the bait 111.

Figure 6:
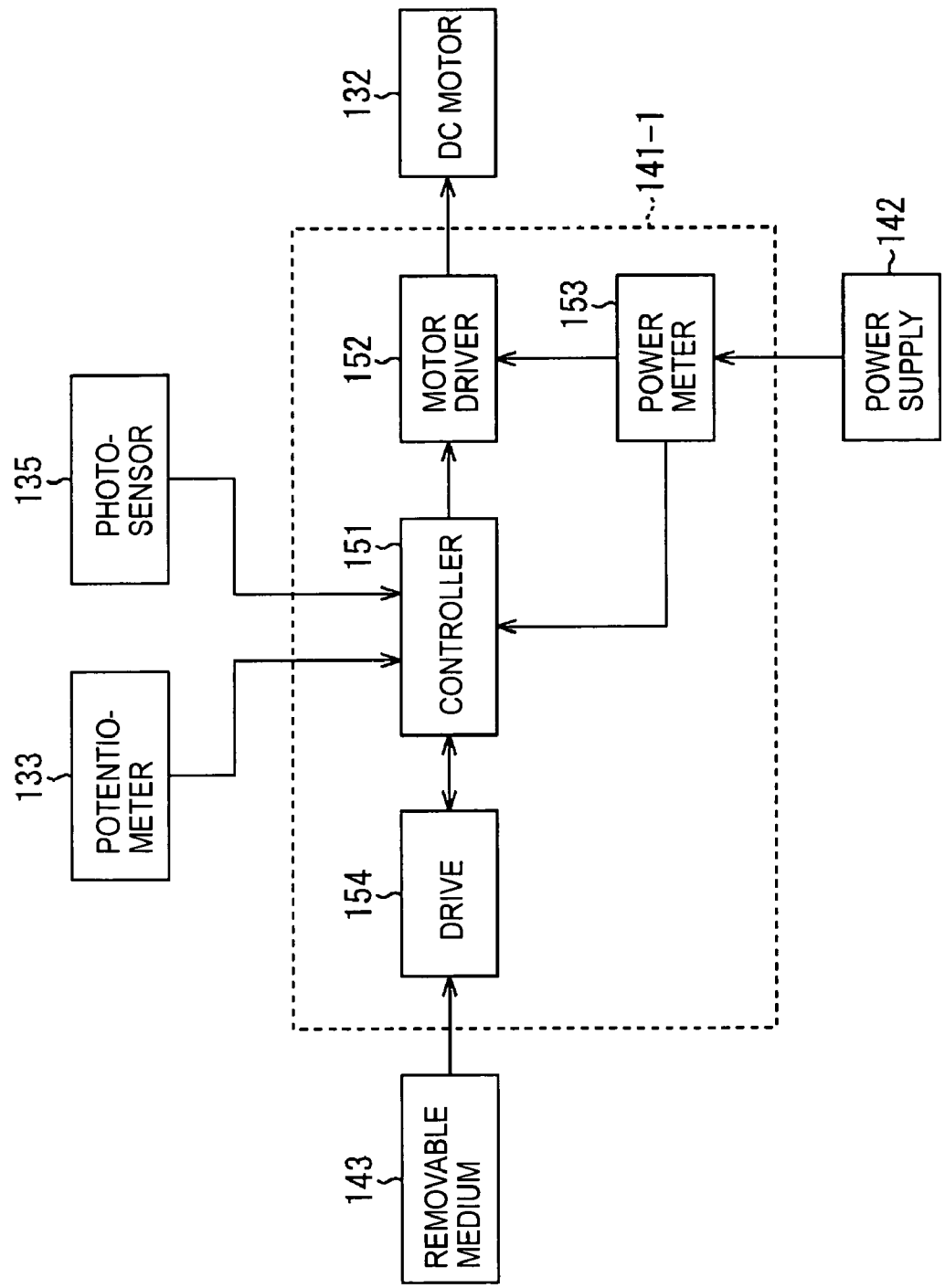
FIG. 6 is a block diagram illustrating a controller controlling an autonomous agent having an arm of FIG. 3.

FIG. 6 is a block diagram of a control unit 141-1 controlling the autonomous agent 101 having the arm 131 discussed with reference to FIG. 5.

The controller 151 controls the motor driver 152, driving the DC motor 132 that rotates the arm 131. In response to an input from the potentiometer 133, the controller 151 observes the present angle (θ) of the arm 131, and detects the angular velocity (ω). In response to an input from the photosensor 135, the controller 151 determines whether the autonomous agent 101 has caught the bait 111 present at the location (θE). The controller 151 learns the action of the arm 131 and the ambient environment and plans a behavior based on the action and the ambient environment. The planning of the behavior will be described later. Based on the planned behavior, the controller 151 controls the motor driver 152 to drive the DC motor 132, and causes the arm 131 to execute the planned behavior.

Electric power supplied from a power supply 142 and consumed by the DC motor 132 is measured by a power meter 153. Measurement results are supplied to the controller 151. The controller 151 calculates the energy level and the lactic energy level, based on the measurement value of the power consumption supplied from the power meter 153. The energy is lowered in proportion to the provided torque and the lactic acid level rises in proportion to the consumed energy while decreasing with constant decomposition in a small amount.

The controller 151 calculates the energy level and lactic acid level of FIG. 4 based on the power consumption data supplied from the power meter 153 and the sensor input supplied from the photosensor 135.

The controller 151 connects to a drive 154 to exchange information, as necessary. A removable medium 143, such as one of a magnetic disk, an optical disk, a magneto-optical disk, and a semiconductor memory, is loaded on the drive 154.

A mechanism other than the photosensor 135 may be used to detect whether the autonomous agent 101 has acquired the bait 111. Such a mechanism other than the photosensor 135 is described below with reference to FIG. 7.

As shown in FIG. 7, the arm 131 of the autonomous agent 101 has a conductive section 161 at the end thereof. The conductive section 161 is grounded via an electric wire 162. When the conductive section 161 of the arm 131 touches a conductive terminal 163 arranged at a location corresponding to the bait 111, a switching device 171 in a control unit 141-2 is connected to the conductive section 161. The controller 151 thus detects that the switching device 171 is switched on, in other words, the arm 131 has reached the bait 111.

The autonomous behavior control model discussed with reference to FIGS. 1 and 2 has the function of the controller 151 of FIGS. 6 and 7.

The learning process of the predictor 31 in the autonomous behavior control model discussed with reference to FIGS. 1 and 2 is described below.

The function approximator of statistical learning is used in the learning process of the predictor 31. Support vector regression (SVR) described in the book entitled in "Support Vector Machine (SVM), Advances in Kernel Methods Support Vector Learning," the MIT Press, 1997 is used as the function approximator.

SVR for regression estimation is available as one class of SVM. SVR is machine learning proposed as a learning algorithm for solving a classification problem. To solve the classification problem, the SVM extracts data important for classification from learning data (hereinafter referred to as a support vector), and constructs a distinction plane. In SVR, this process is applied to a regression problem.

In the autonomous agent 101 described with reference to FIG. 4, an: observed state variable is $S=(\theta, \omega, E, L)$, and an action taken by the autonomous agent 101 is $A=(\tau)$. In the predictive learning of the predictor 31, functions of difference equations (1) through (4) for predicting variables at time (t+1) from variables at time t are estimated. More specifically, the prediction of the predictor 31 is performed by predicting rates of changes in the variables ($\Delta\theta, \Delta\omega, \Delta E, \Delta L$) rather than directly predicting the variables at time (t+1).

$$\theta_{t+1} - \theta_t = f_\theta(\theta_t, \omega_t, E_t, L_t, \tau_t) \quad (1)$$

$$\omega_{t+1} - \omega_t = f_\omega(\theta_t, \omega_t, E_t, L_t, \tau_t) \quad (2)$$

$$E_{t+1} - E_t = f_E(\theta_t, \omega_t, E_t, L_t, \tau_t) \quad (3)$$

$$L_{t+1} - L_t = f_L(\theta_t, \omega_t, E_t, L_t, \tau_t) \quad (4)$$

In practice, the predictor 31 performs function learning in which a variable observed and executed at time (t−1) is input with a current variable serving as a supervisor signal at time t. The predictor 31 continues to learn in response to a learning sample provided at each time. Even if the prediction of the predictor 31 is initially large, the accuracy of function approximation is improved as a plurality of experiences is gained for a long period of time. Prediction error is thus reduced.

Neural networks can perform estimation asymptotically by successively supplying samples, but SVR having high generalization and short convergence time is used herein. SVR is typically a batch-type learning machine, and accurate on-line support vector regression (AOSVA) is proposed as successive learning algorithm by Junshui Ma, James Theiler, and Simon Perkins in the paper entitled "Accurate on-line support vector regression", Neural Computation, vol. 15, 11, pp. 2683-2703, 2003, MIT Press. The predictor 31 employs accurate online support vector regression (AOSVR). Gaussian kernel is used as a kernel of SVR.

The planning performed by the planner 33 is described below.

The goal state required for the planning of the planner 33 is provided by the evaluator 32. For example, $\theta d = \pi$ (the arm 131 is tilted upright to $\theta = 180°$) is provided as a goal state. The planner 33 generates a torque sequence provided as an action from the current state S0 to the goal state by searching.

In the searching executed by the planner 33, a heuristic searching technique is used. For example, A* search algorithm disclosed by J. Pearl in the book entitled "Heuristics: Intelligent Search Strategies for Computer; Problem Solving," Addison-Wesley, 1985 is used to determine an action of the autonomous agent 101.

The A* search algorithm is described below.

(a) A next state is determined with all possible actions taken from the current state. A link is made from a current node to the resulting state as a new node. (The predictor 31 is used to determine the next state).

(b) If the next state, namely, the destination of the link, is equal to (or close to) another already reached state, arrival costs to that node (for example, time required to reach that node) are compared.

(c) Of the comparison results, a lower cost result is selected while a higher cost result is discarded.

(d) If the new node is generated in the next state, in other words, the link destination is different from another state already reached in step (a), or if the link destination made in step (a) remains as a lower cost result; in step (c), an evaluation function represented by equation (5) is calculated for each new node to include the new node as a node candidate:

$$f(n) = g(n) + \alpha \cdot h(n) \quad (5)$$

where g(n) represents a path cost from a start node to a current node, h(n) represents an estimated cost of a path from the current node to a goal node (a distance to a goal in the state space is used), and a represents a weighting factor (a budget of the above-referenced two costs).

(e) A node having the lowest evaluation function is selected from among all node candidates, and set as a current node.

(f) The node selected as the current node in step (e) is excluded from the node candidates.

(g) Steps (a) through (f) are iterated until the state reaches or comes close to the goal state.

Based on the planning of the planner 33, the controller 34 controls the execution of the action based on the behavior, i.e., the behavior sequence. By iterating the planning of the planner 33 and the execution (behavior) of the plan of the controller 34, the autonomous agent 101 reaches the goal state. The iteration of the planning of the planner 33 and the execution (behavior) of the plan of the controller 34 is described with reference to FIG. 8, FIGS. 9A-9E and FIGS. 10A-10E.

FIGS. 8 and 9A-9E show state spaces 201 with the ordinate representing speed ω and the abscissa representing position θ. At a start position 211, the arm 131 looks vertically downward ($\theta = 0$ (0°)) at a speed of zero in real space (0 in the ordinate and the abscissa). At a goal position 212, the arm 131 looks vertically upward ($\theta = \pi$ (180°)) at a speed of zero in real space. The goal position 212 is represented by a solid circle as shown. In the state space 201, $\pi = -\pi$. The solid circle appears on the right-hand portion in the state space 201. The goal position 212 is also represented by $\theta = -\pi$ and $\omega = 0$.

As shown in FIGS. 8 and 9A-9E, calculated nodes are represented blank circles, path candidates are represented by solid lines, and candidate nodes, namely, the leading end of the path is represented by the letter X.

A stationary state ($\theta = 0$ and $\omega = 0$) is now provided as the initial state S0. If a search is performed using a sufficiently accurate (i.e., sufficiently learned) predictor 31, a path from the start position 211 to the goal state 212 is searched. As shown in FIGS. 9A-9E, the nodes are dispersed in the space ($\theta$, $\omega$). If sufficiently long time is used in the search, the goal state is reached as shown in FIG. 9E.

As shown in FIG. 8, the search starts at the start position 211, the path candidate is calculated based on the calculated nodes, the leading end of the path becomes a node candidate, and a node candidate having the lowest evaluation function from among the candidate nodes is set as a current node.

Based on the above-referenced A* search algorithm, the planner 33 determines a next state that takes all actions available from the current state (current node), and makes a link from the current node to that state as a new node. If the link destination is equal to or close to another state already reached, the planner 33 compares arrival costs to the node, and adopts the node having a lower cost, while discarding the node having a higher cost. If a new node is generated, the planner 33 calculates the evaluation function of equation (5) for each new node, and adds the new node to the node candidate (with preceding nodes remaining). The planner 33 selects a node having the lowest evaluation function from among all candidate nodes, namely, the most likely path, as a next current node, deselects the node selected as the current node, and further determines a next state if the new current node takes all possible actions.

Searching is iterated in this way. When any of the node candidates equals or becomes sufficiently close to the goal state, the search based on the A* search algorithm ends, and the plan is decided.

FIGS. 9A-9E illustrate the relationship between the dispersion of the nodes and time in the search process before deciding the plan. FIG. 9A illustrates a state at the moment no sufficient time has elapsed since the start of a trial. As time elapses, the nodes disperse in the ($\theta$, $\omega$) space as shown FIG. 9B, FIG. 9C, and FIG. 9D. With sufficient time allowed, a behavior sequence reaching the goal state 212 is determined as shown in FIG. 9E.

The plan illustrated in FIGS. 9A-9E results in a correct sequence without any problem if a state transition model is precise. However, if the predictor 31 is learning with a precise state transition model yet to be obtained (i.e., the degree of learning by the predictor 31 is insufficient), the planner 33 can generate an erroneous sequence based on an erratic prediction of the predictor 31.

The autonomous agent 101 executes the plan created by the erratic prediction at any rate. As a result, the autonomous agent 101 can transition to an unpredictable state, and the predictor 31 learns the execution results. More specifically, the input and output relationship not yet experienced (the prediction of an environment at next time based on the current environment and the action) are learned. As the learning process is in progress, the prediction error is corrected. When the behavior of the autonomous agent 101 is planned again by the planner 33, a plan different from the plan generated based on the erratic prediction is thus obtained.

Since the predictor 31 uses the function approximator of statistic learning, not only the prediction of the output responsive to the learned input but also the prediction of the output responsive to the input in the vicinity of the learned input are improved.

If the goal state is not reached after the execution of the plan, the current state of the autonomous agent 101 is modified from the initial state. A next behavior sequence from that state to the goal state is planned based on the prediction of the predictor 31 having experienced in learning, and the planned behavior sequence is executed. As the plan and the execution are iterated, the prediction of the predictor 31 becomes gradually accurate. The planner 33 thus obtains a behavior sequence that arrives at the goal state.

FIGS. 10A-10E illustrate an example in which an error between a plan and the execution result of the plan degreases as each plan is executed in the ($\theta$, $\omega$) space, and finally a goal arrival sequence is executed (at a fifth iteration in FIG. 10E).

As FIG. 8 and FIG. 9A-9E, FIGS. 10A-10E show a plot of a planned behavior sequence versus actual behavior with the ordinate representing speed $\omega$ and the abscissa representing position $\theta$. The planned behavior sequence is represented by broken-line curve and the executed behavior sequence is; represented by solid-line curve. The leading end of the broken-line curve showing the plan is a goal position (represented by symbols (::)).

In a first trial (trial 1) of FIG. 10A, a discrepancy takes place between the plan and the behavior.

If the plan is executed but proves unsuccessful, in other words, fails to reach the goal position, a plan is again made from the end of the first trial to the goal, and a second trial is then performed.

A discrepancy also takes between plan and execution in each of a second trial (trial 1) of FIG. 10B, a third trial (trial 3) of FIG. 10C, and a fourth trial (trial 4) of FIG. 10D. However, prediction accuracy improves and the discrepancy between plan and execution is reduced each time the predictor 31 learns the results. From the end of each trial, a plan is developed to the goal state again.

In a fifth trial (trial 5) of FIG. 10E, a successful sequence with almost no error is achieved.

As the plan and execution are iterated, the predictor 31 learns more, improving prediction accuracy. The planner 33 can thus plan the behavior sequence that arrives at the goal state.

The learning process of the controller 34 is described below.

The function approximator of statistic learning is used in the learning process of the controller 34. The above-referenced SVR is used as the function approximator, for example. If a successful sequence is executed, the controller 34 learns, as a function represented by equation (6), the relationship between each state from the initial state to the goal state and the action performed at that state.

$$a_{t+1} = g_d(S_t) \quad (6)$$

Figure 11:
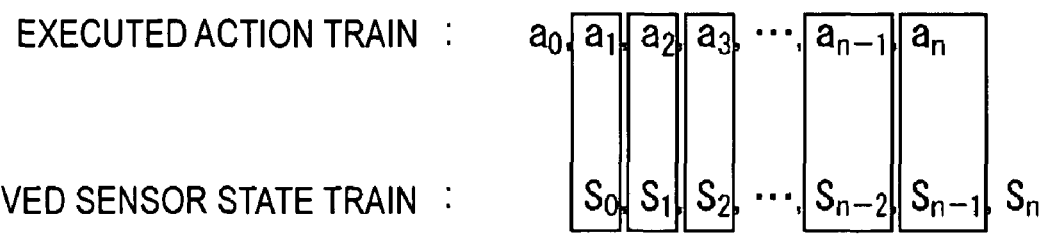
FIG. 11 illustrates data at which a relationship between each of states between an initial state to a goal state and an action performed at the state is learned as a function.
Figure 13A:
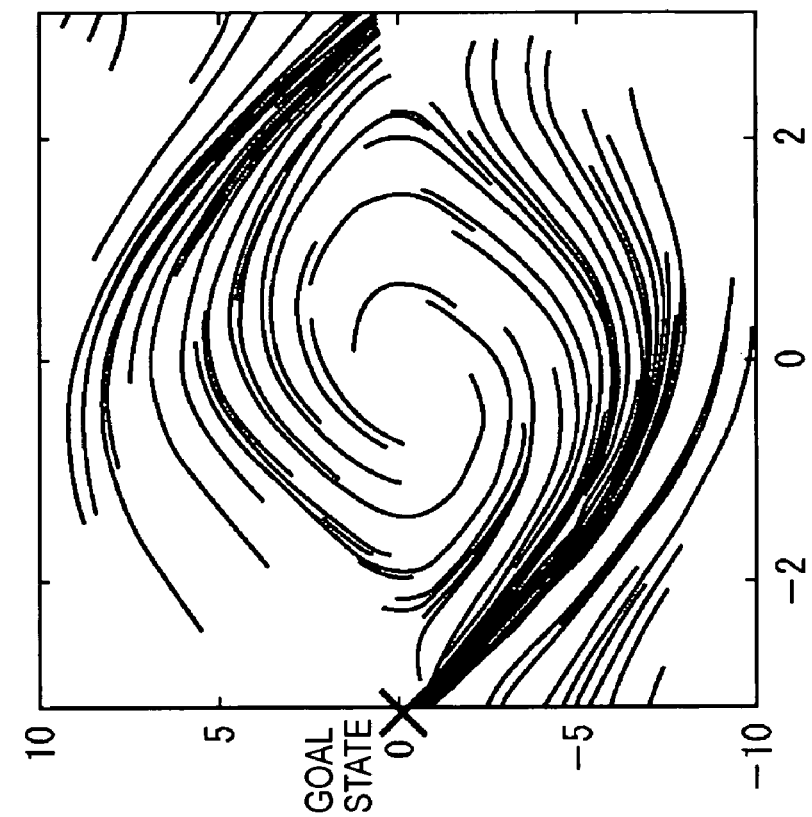
FIGS. 13A and 13B illustrate a transitional structure from any state transitioning to the goal state.
Figure 13B:
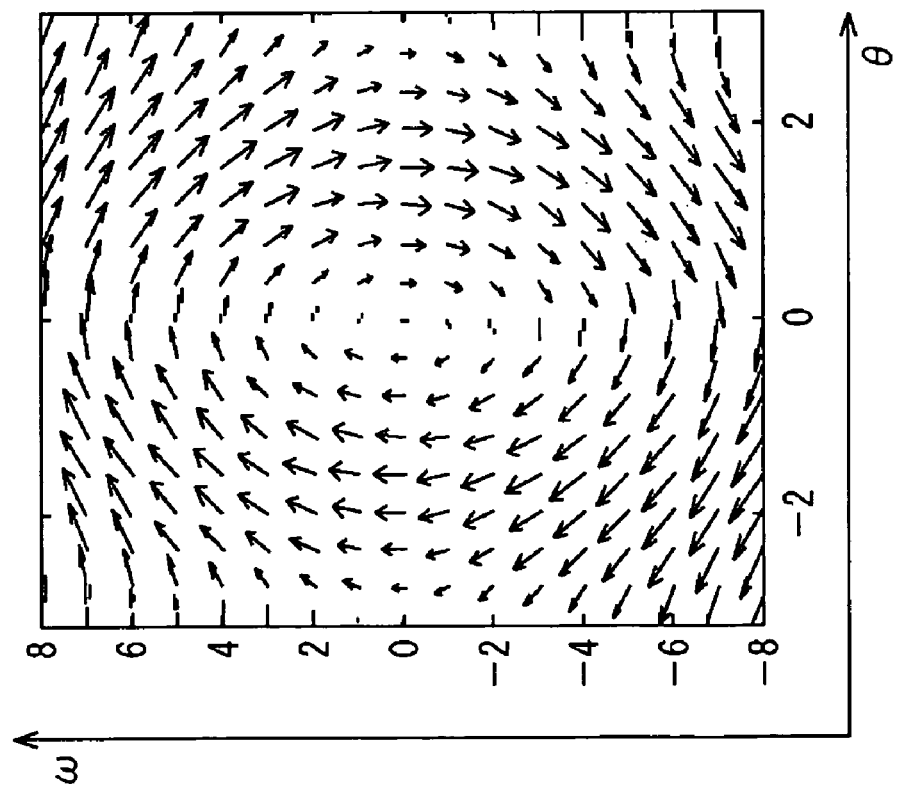

FIG. 11 illustrates the relationship of data used in equation (6) at each of state 0 to state n.

By learning a pair enclosed in a rectangle shown in FIG. 11 (input and output with a goal state being as a fixed input), the controller 34 determines an action $a_{t+1}$ to be performed from the state observed at time t to next time (t+1).

Since the function approximator of statistic learning is used in the learning process of the controller 34, learning of the successful sequence leads to improvements in the behavior in the vicinity of the learned path in the control of the subsequent behavior.

By causing the controller 34 to repeatedly learn a plurality of successful sequences (successful experience), the autonomous agent 101 acquires a controller that can approach the goal state (function to be performed by the controller 34) from any state.

More specifically, the goal state is that the arm 131 is at the upright position ($\theta=\pi(180°)$, and $\omega=0$). As successful sequences from a plurality of states to the goal state are successively accumulated as learning samples as shown in FIGS. 12A-12E, the controller 34 learns a process approaching, from any state, the goal state shown in a phase charts of FIGS. 12A-12E, namely, a set of successful sequences that allows the arm 131 to reach from any position to the goal state.

In the state spaces of FIGS. 12A-12E and FIGS. 13A and 13B, $\pi=-\pi$.

In the autonomous agent, the function is specifically represented in equation (7), and using ($\theta$, $\omega$) observed at time t, a torque output at next time (t+1) is determined, and a tilt-up sequence is thus generated:

$$\tau_{t+1} = g_{\theta=\pi,\, \omega=0}(\theta_t, \omega_t) \quad (7)$$

The controller 34 can acquire control g for controlling the behavior from any state to a goal state if the same learning as described above is learned as a function represented by equation (8) with the goal state being as a parameter (if inputs and output are learned with the goal state and the environment being the inputs and the action being the output). In this case, the evaluator 32 successively modifies the generated goal state, and repeats the production of a plan to the generated goal state and execution of the plan. Successful sequences for a variety of goal states are thus experienced. A controller (controlling the behavior to reach from any state to any goal state control to be performed by the controller 34) is acquired.

$$a_{t+1} = g(S_t, S_d) \quad (8)$$

In accordance with the present invention, when the evaluator 32 sets a goal state, the predictor 31 successively learns the input and output relationship of the agent. The planner 33 plans the behavior sequence searching a particular path to the goal state based on the prediction of the predictor 31. The plan is then executed under the control of the controller 34. If the plan is successfully executed with the goal state reached, the controller 34 learns the path pattern (successful sequence). By iterating such learning, the autonomous agent 101 acquires the controller 34 that automatically reaches the goal from any state.

In other words, the predictor 31 constantly learns the relationship between the action taken by the predictor 31 and a change in the environment (a change in sensor input), and even if an erroneous plan is executed, the predictor 31 is improving the prediction accuracy. The planner 33 makes the plan by rehearsing the prediction of the predictor 31 from the current own state to the goal state. The controller 34 controls the execution of the action forming the planned behavior sequence. If the actually planned goal state proves successful, the input and output relationship of the behavior sequence is learned. The function approximator of statistical learning (such as support vector regression) is used in the predictive learning of the predictor 31 and the control learning of the controller 34. The planner 33 generates the behavior sequence using a heuristic search technique (A* search algorithm, for example).

More specifically, the predictor 31 performs predictive learning in a manner free from the number of dimensions, using the capability of the function approximator that learns the large number of samples and an input of high dimensions. Even if an erroneous plan generated by an unskilled predictor 31 is executed, the predictor 31 experiences an unfamiliar state space, thereby improving prediction performance thereof.

The state space is expanded in response to an increase in the number of input dimensions when the planner 33 uses the technique of heuristic search. In comparison with Q learning or dynamic programming, however, the combination explosion of searches is effectively controlled.

The repetition of learning of the successful sequence allows the controller 34 to be generalized.

With the embodiment of the present invention implemented, control with a goal state being a continuous quantity parameter is learned. In this way, a controller controlling a behavior for reaching any goal state from any state (control to be performed by the controller 34) is acquired. In accordance with the embodiment of the present invention, learning matching the way of human thinking is performed. As a result, a behavior pattern easily understood by humans is thus generated.

The embodiment of the present invention is free from the curse of dimensionality. With a pattern learner such as SVM used in the learning of the predictor 31 and the controller 34, a heuristic search is used to search efficiently a vast state space. A goal behavior sequence is thus autonomously generated. Since this series of flow steps accounts for the way of human thinking, a resulting behavior is easily understood by humans from the outside, and a solution is reached within a practical period of time.

If one of the setting of a goal state, the variable of an observable environment, and a dimension selected as a variable controlling a behavior is appropriate, the planner 33 becomes enabled to plan a behavior sequence reaching the goal state as the predictor 31 is in progress in the learning process thereof. The controller 34 thus learns the successful sequence.

If the number of dimensions of the variables of the observable environment is large in the control of the autonomous agent, or if the number of dimensions of the variables controlling the behavior in the control of the autonomous agent, a substantial process in learning may or may not be achieved depending on which dimension is selected as an input and output or depending on how the goal state is set. More specifically, the progress in the learning process depends on the input and output relationship learned by the predictor 31, the input and output relationship used in the planning of the planner 33, and the setting of the goal state by the evaluator 32. For example, a process toward the arrival at the goal state may become too complex. The planning of the behavior sequence enabled to reach directly the goal state may be difficult because the distance from the current position to the goal state is too far. There may be no correlation in a selected input and output relationship. When a correlation, if present, is relatively loose, the planning of the behavior sequence from the current state to the goal state may be difficult. In such cases, the learning process cannot progress, and the autonomous agent cannot achieve growth that is based on successful sequences.

In such a case, the autonomous agent determines whether the planner 33 could plan the behavior sequence reaching the goal state from the current state, and modifies the task (variable) and the action as necessary.

The evaluator 32 acquires a predictive error, a planning error, and a control error respectively from the predictor 31, the planner 33, and the controller 34, determines whether prediction, planning, and control have been improved, and resets the goal state as necessary. With the goal state reset, the controller 34 can layer control.

The predictive error, the planning error, and the control error will be described in more detail later.

The autonomous agent sets the goal state and performs reinforcement learning, thereby layering the controller 34. This process of the autonomous agent is described below with reference to FIGS. 14-24.

Figure 14:
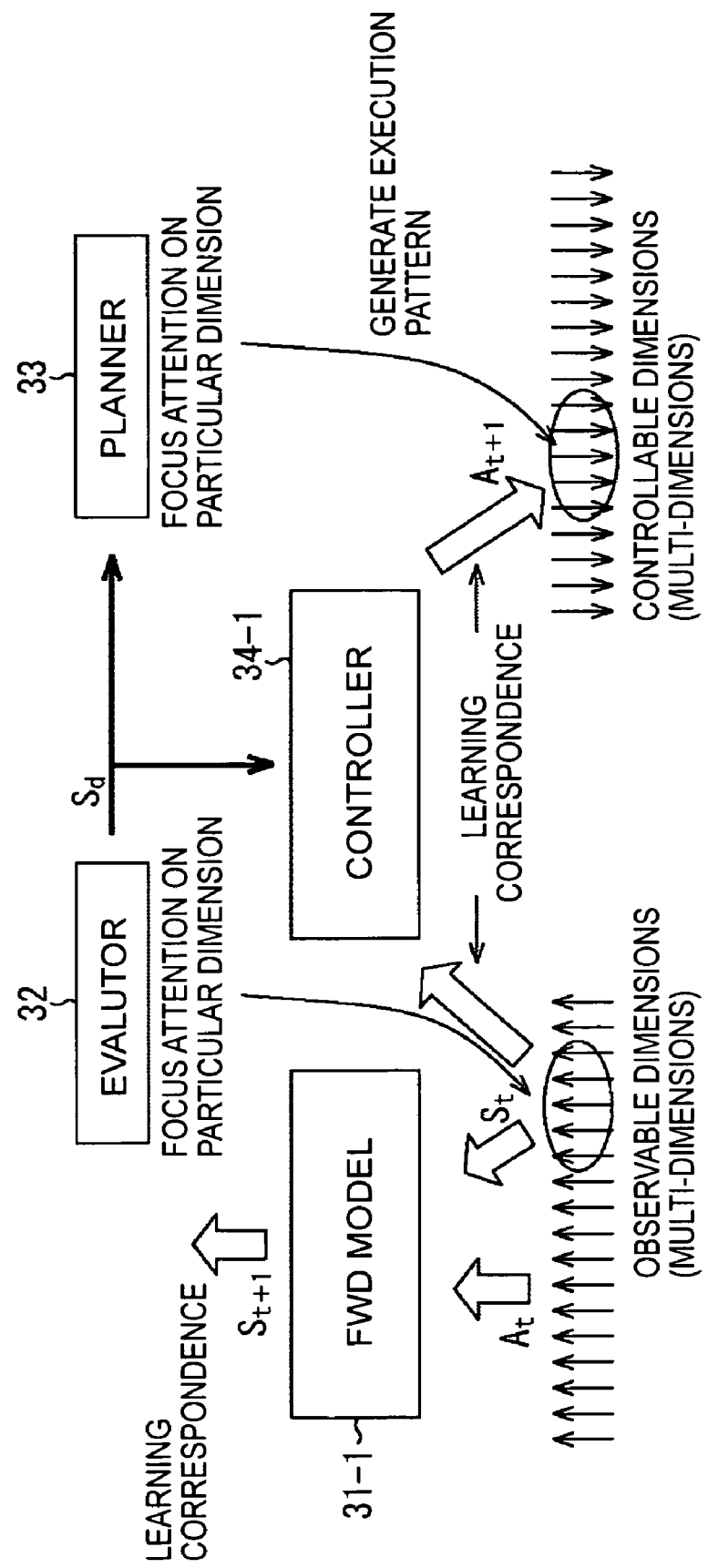
FIG. 14 illustrates an example of an execution flow.

As shown in FIG. 14, the autonomous agent has variables as multi-dimensions observed as an environment, and variables as controllable multi-dimensions.

The evaluator 32 focuses attention on a particular; dimension from among input multi-dimensions. A dimension having a small amount of accumulated predictive error may be selected with a priority placed on controllability as a dimension selection criterion. A dimension having a large amount of accumulated predictive error may be selected with a priority placed on improvement in predictability. Alternatively, dimensions may be selected in a random fashion.

The evaluator 32 sets a state as a goal in the selected dimension, and supplies the goal state to the planner 33 and a controller 34-1. A state having undergone a large number of experiences may be selected with a priority placed on the learning results accumulated in experience as a setting criterion in the goal state. A state having undergone a smaller number of experiences may be selected with a priority placed on necessity for searching a portion unexperienced in the state space. Alternatively, states may be selected in a random fashion.

The planner 33 selects a particular dimension from executable actions (output dimensions). An action having a high correlation with the selected input dimension may be selected with a priority placed on the correlation with the variable selected as an input, as an action selection criterion. Alternatively, actions may be selected in a random fashion.

Using the prediction of a predictor 31-1, the planner 33 searches a behavior sequence by rehearsing, in response to the selected action, the behavior sequence from the current state to the goal state instructed by the evaluator 32.

If an appropriate action dimension is selected, a solution to the goal state is present. The planner 33 generates the behavior sequence, and the controller 34-1 controls the behavior sequence. If an appropriate goal state is set, an appropriate action dimension is selected, and the predictive learning is in progress. A successful sequence is thus obtained. The controller 34-1 learns the input and output relationship in the successful sequence.

If the selected input dimension, the goal state, and the action dimension are appropriate, the controller 34-1 learns the successful experience, thereby improving performance.

In contrast, one of the set goal and the selected action may not be appropriate, and a behavior sequence approaching the goal cannot be planned. Such a case will be described with reference to FIGS. 15A-15D through FIG. 17.

The evaluation of the plan of the behavior sequence to be planned by the planner 33 is described below with reference to FIGS. 15A-15D. As shown in FIG. 15A-15D, the abscissa represents time while the ordinate represents relative position with respect to the goal state in the state space. Xgoal denotes the goal state provided by the evaluator 32, and Xplan denotes the behavior sequence to the goal state planned by the planner 33.

Figure 15A:
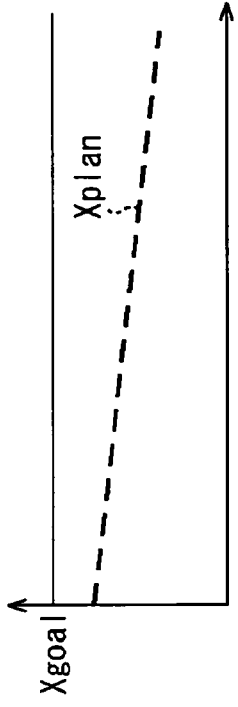
FIGS. 15A-15D illustrates an evaluation of a plan.

If Xplan goes away from Xgoal with time as shown in FIG. 15A, the set goal and the selected action dimension are not appropriate, and it is determined that a behavior sequence reaching or comes close to the goal cannot be planned.

If searching to the goal state by the planner 33 is continuously performed beyond the time limitation expected to reach the goal state, efficient learning cannot be achieved. In other words, only a behavior sequence difficult to achieve, namely, only a behavior sequence taking an extremely long period of time before reaching the goal state may be generated. In such a case, the learning process of the autonomous agent is efficiently advanced by modifying the action dimension.

Figure 15B:
Figure 15C:
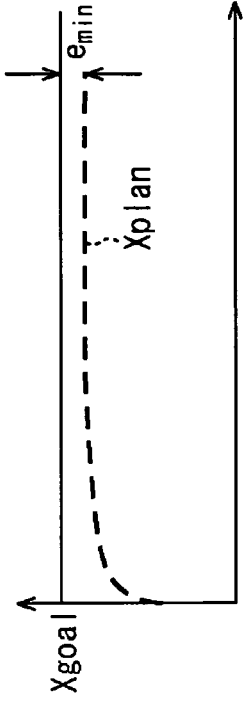
Figure 15D:
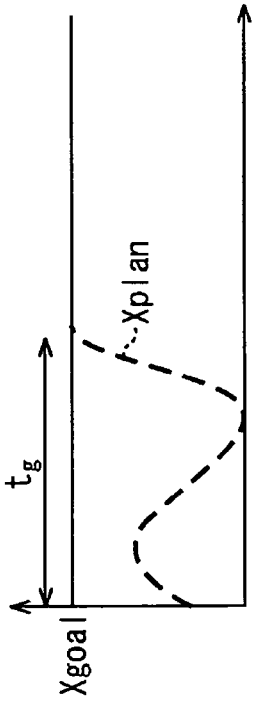

If the absolute value of a difference between Xgoal and X(t)plan is accumulated and the accumulated value is above a predetermined threshold as shown in FIG. 15B, the planner 33 may determine that a behavior sequence reaching the given goal state cannot be generated. If the minimum value of a difference between Xgoal and Xplan is above a predetermined threshold as shown in FIG. 15C, the planner 33 may determine that a behavior sequence reaching the given goal state cannot be generated. If expected time required for X(t) plan to reach Xgoal is above a predetermined threshold as shown in FIG. 15D, the planner 33 may determine that a behavior sequence reaching the given goal state cannot be generated.

According to these determination criteria, the planner 33 determines whether a behavior sequence reaching the given goal state can be generated. Even if it is determined that a behavior sequence reaching the given goal state cannot be generated, the planner 33 still is herein unable to determine whether the cause that the behavior sequence reaching the given goal state cannot be generated is due to an inappropriate goal setting or an inappropriate selected action dimension.

Figure 16:
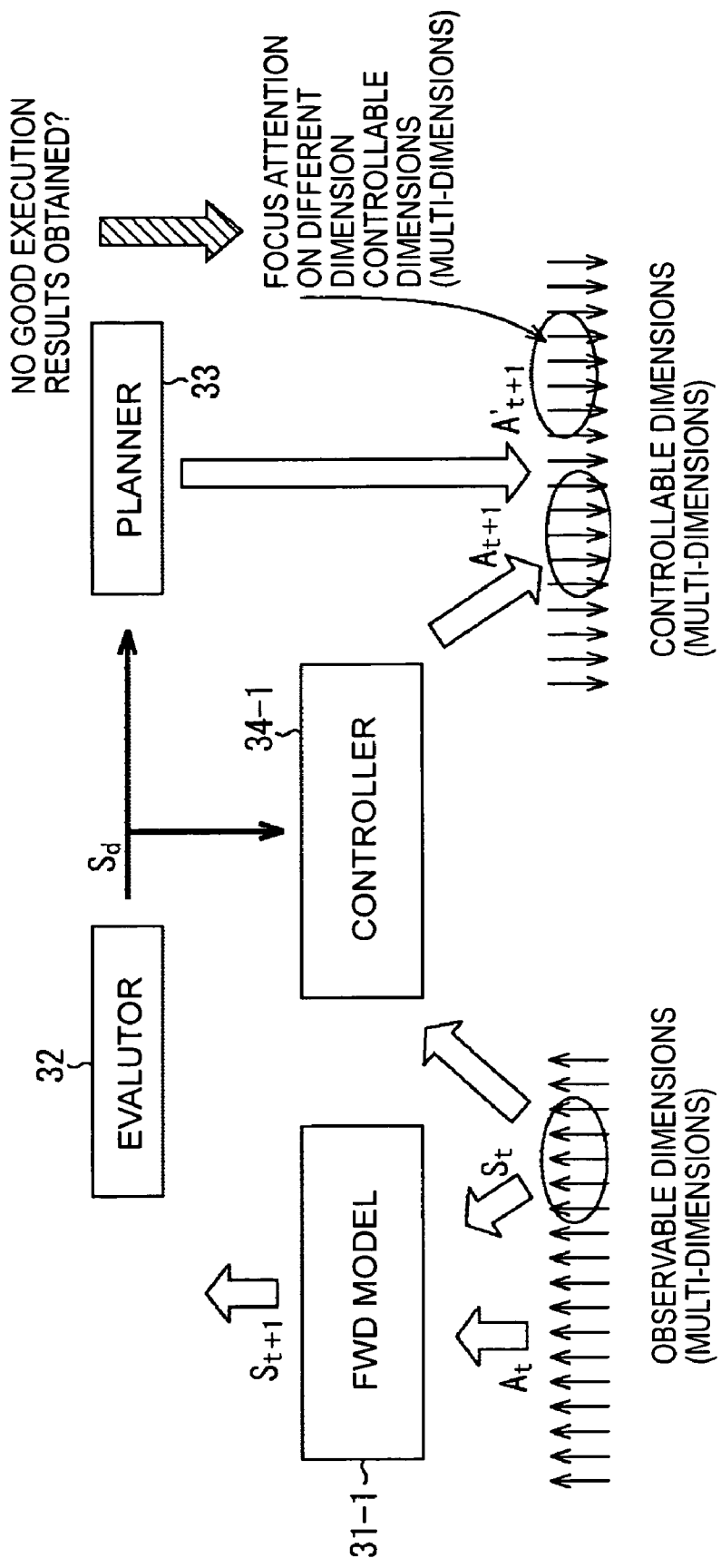
FIG. 16 illustrates another example of the execution flow.

The planner 33 determines whether the behavior sequence to reach the given goal state is generated in response to the input dimension selected by the evaluator 32 under a variety of conditions discussed with reference to FIGS. 15A-15D. If it is determined that the behavior sequence to reach the given goal state cannot be generated, the planner 33 notifies the evaluator 32 that the behavior sequence cannot be generated while discarding the selected action dimension and re-selecting an action dimension from the plurality of action dimensions as shown in FIG. 16.

Figure 17:
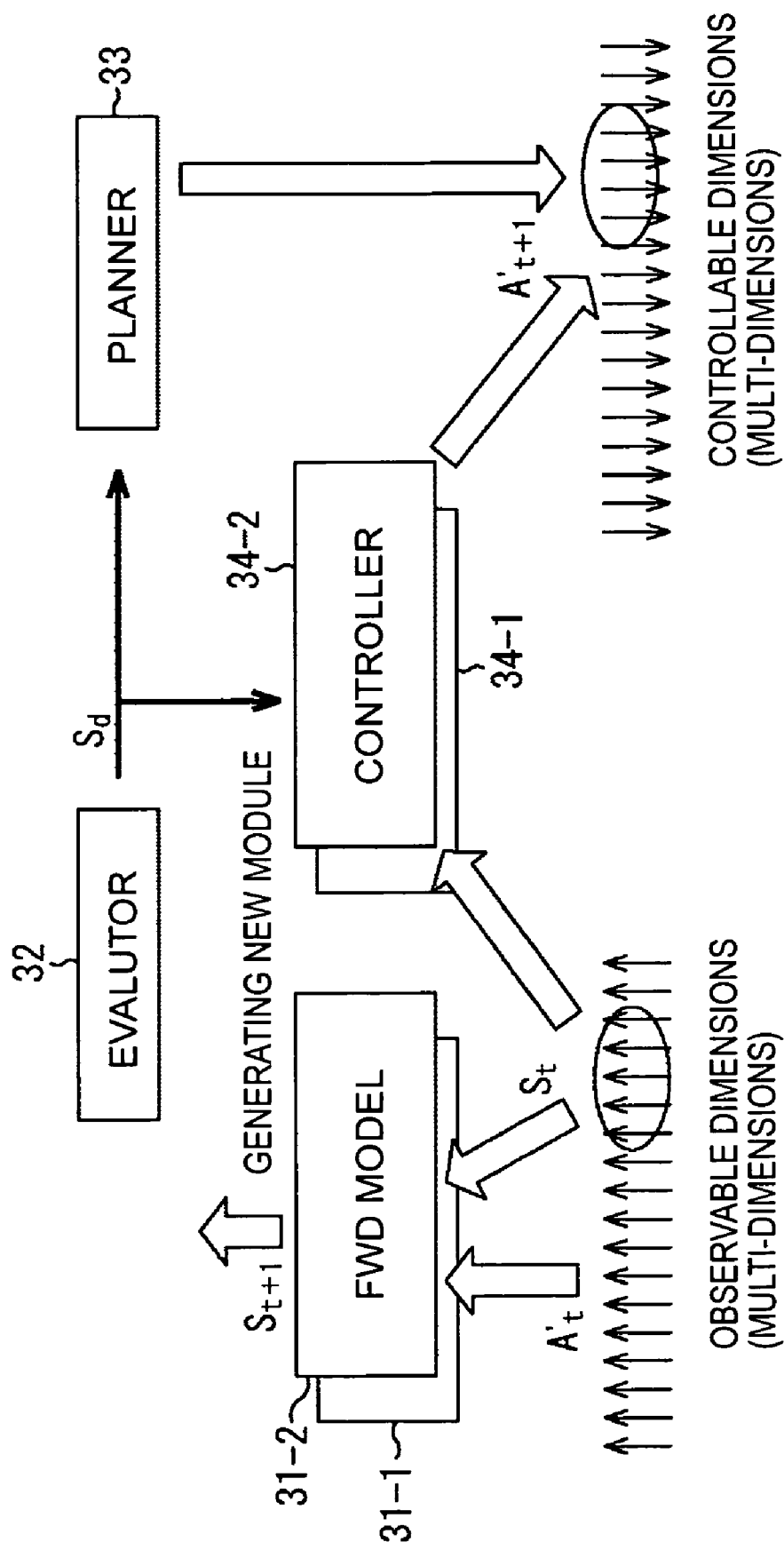
FIG. 17 illustrates yet another example of the execution flow.

If the action dimension is re-selected, the relationship between the goal state and the action to achieve that goal state changes. As shown in FIG. 17, the planner 33 generates a behavior sequence using prediction results provided by a predictor 31-2 in response to a new goal state and an action. In response to the new goal state and the action, a controller 34-2 controls the behavior sequence. When a successful sequence results, the controller 34-2 learns the successful sequence.

A plurality of predictors 31 and controllers 34 are constructed for each relationship of the goal state and the executed action.

A monitoring function for monitoring a task progress of the evaluator 32 during the plan generation and execution is discussed with reference to FIGS. 18 through 20.

Figure 18:
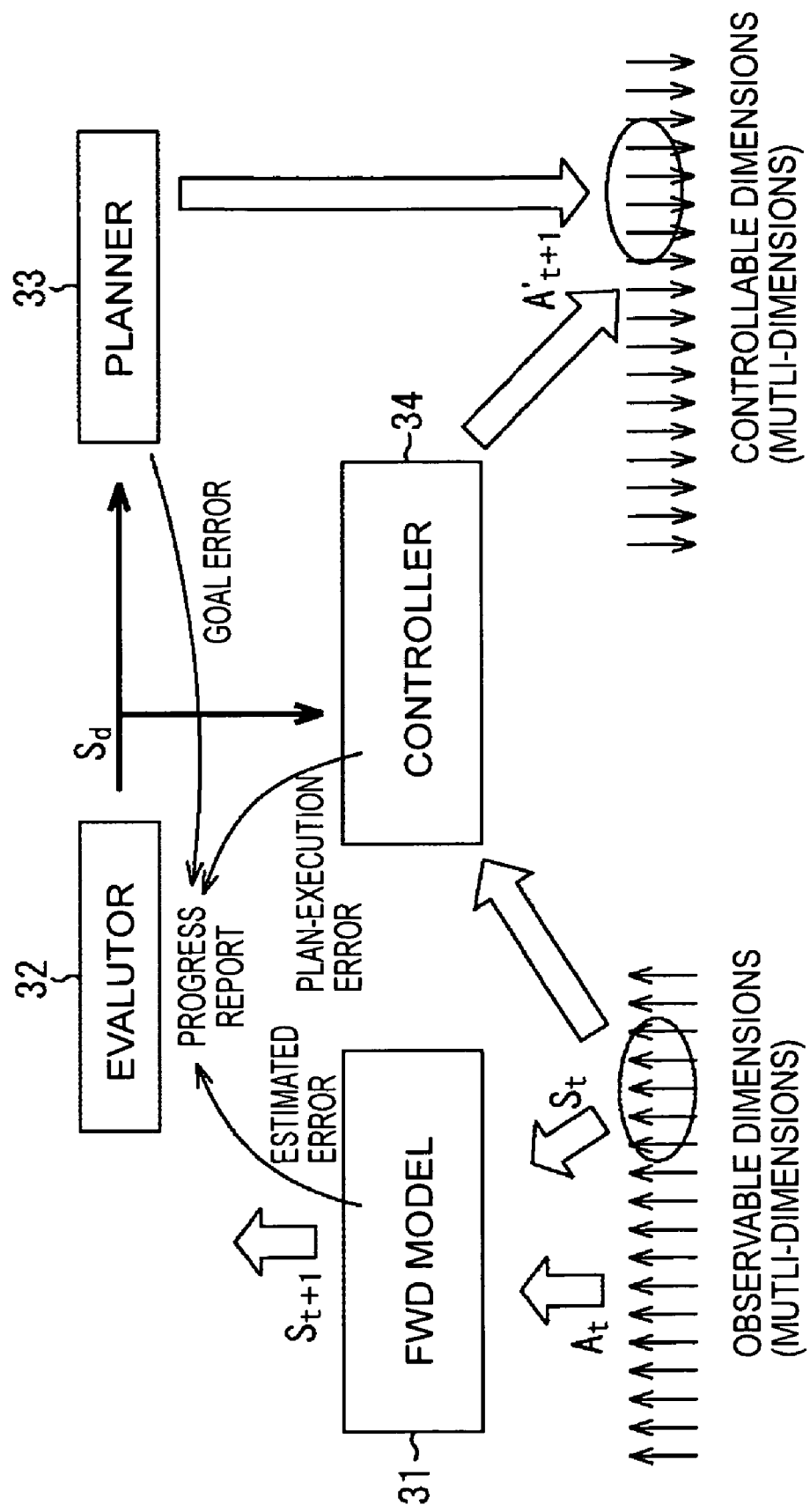
FIG. 18 illustrates still another example of the execution flow.
Figure 19:
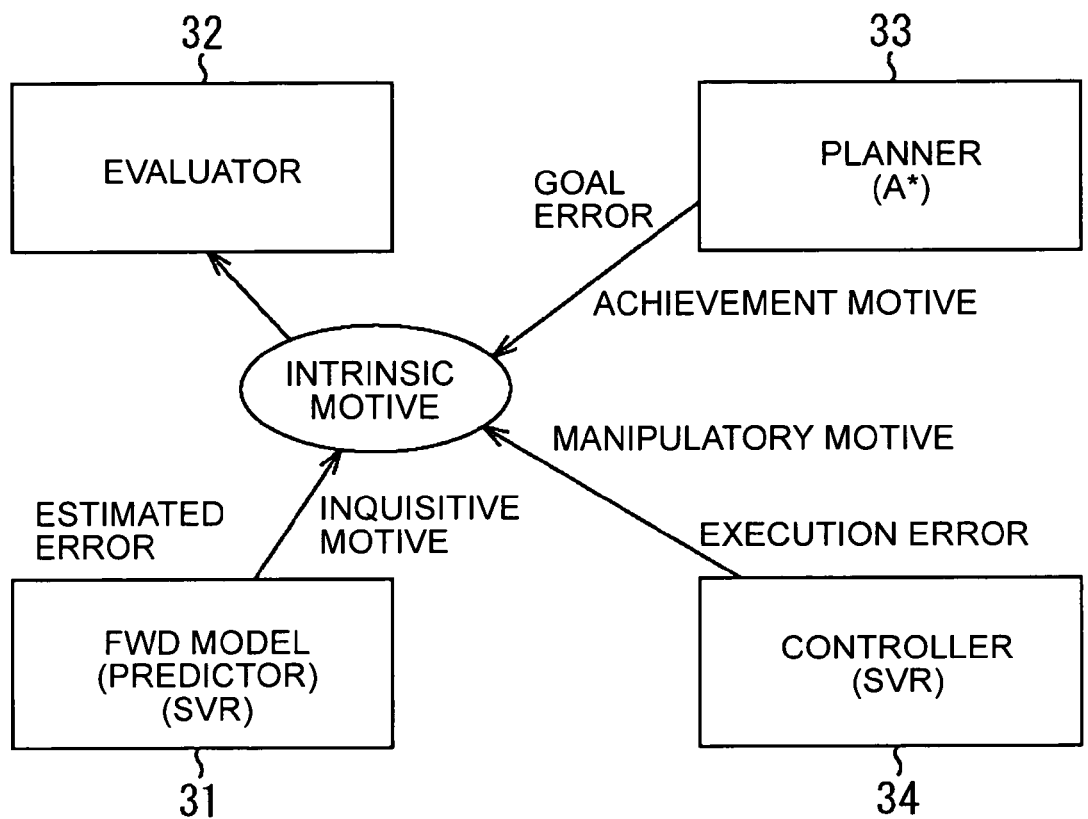
FIG. 19 illustrates implementation of an intrinsic motive.

Referring to FIG. 18, error information is discussed. The error information is supplied from the predictor 31, the planner 33 and the controller 34 for the evaluator 32 to monitor the task progress.

When the controller 34 controls the behavior sequence planned by the planner 33, the predictor 31 learns an input and output relationship newly experienced while comparing prediction results thereof with execution results. The predictor 31 then supplies, to the evaluator 32, the comparison results as the predictive error (estimated error).

The planner 33 calculates plan achievement indicating how close the behavior sequence currently planned comes to the goal state, and supplies the plan achievement as a goal error to the evaluator 32.

The controller 34 generates an evaluation behavior sequence for use in evaluation of control performance based on the observed value of the execution result of the behavior sequence and the output (action) of the controller 34. In the same way as the planner 33 does, the controller 34 generates the evaluation behavior sequence based on the prediction of the predictor 31. The controller 34 determines the control error (planning error minus execution error) by comparing the generated evaluation behavior sequence with the behavior sequence planned by the planner 33, and supplies the determined control error to the evaluator 32.

When the task is performed, the evaluator 32 receives a variety of error signals including the predictive error (estimated error), the goal error, and the control error (planning error minus execution error) from the respective modules. As shown in FIG. 19, the predictive error (estimated error) of these errors corresponds to inquisitive motive of the intrinsic motives of psychology, the goal error corresponds to achievement motive of the intrinsic motives of psychology, and the control error (planning error minus execution error) corresponds to manipulatory motive of the intrinsic motives of psychology. More specifically, the setting of the tasks executed by the evaluator 32 is performed to satisfy inquisitive motive, achievement motive, and manipulatory motive in the same way as humans control their behaviors in accordance with their intrinsic motives.

Figure 20:
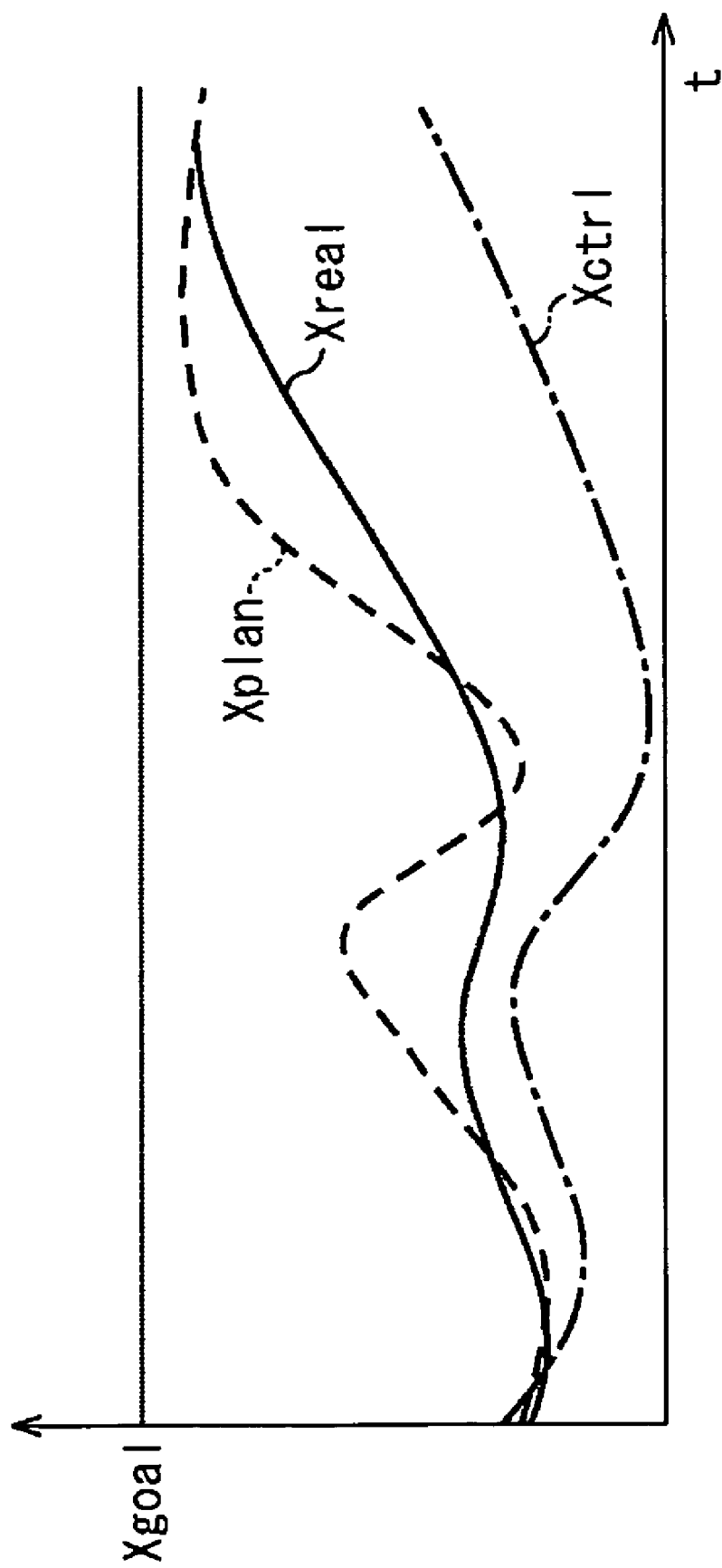
FIG. 20 illustrates data obtained from a task.

FIG. 20 illustrates data of the errors that is obtained when the behavior sequence planned by the planner 33 is executed.

Referring to FIG. 20, the abscissa represents time while the ordinate represents relative position with the goal state in the state space. Xgoal denotes the goal state provided by the evaluator 32, Xplan denotes the behavior sequence to the goal state planned by the planner 33, Xctrl denotes the evaluation behavior sequence obtained when the controller 34 rehearses control using the prediction of the predictor 31, and Xreal denotes the results obtained when the behavior sequence planned by planner 33 is actually executed.

An accumulated value of a difference between Xplan and Xctrl may serve as an index evaluating the control accuracy of the controller 34, and an accumulated value of a difference between Xreal and Xplan may serve as an index evaluating the prediction accuracy of the predictor 31. Since it takes time for a task to complete the behavior sequence, mean accuracy per unit time obtained by dividing each of the evaluation indexes by time depends less on the task.

The predictor 31, the evaluator 32, and the controller 34 can calculate the indexes at each trial of the planned behavior sequence using a variety of methods. For example, indexes represented by equations (9) through (11) may be generated.

Skill Ectrl as an index (evaluation value) indicative of skill level of the controller 34 is expressed by equation (9):

$$E_{ctrl} = \frac{\sum_t |X_{plan}(t) - X_{ctrl}(t)|}{\Delta t} \quad (9)$$

Skill Ectrl corresponds to an error between the behavior sequence planned by the planner 33 and the evaluation behavior sequence generated by the controller 34. When the controller 34 has gained sufficient successful sequences, the evaluation behavior sequence almost as good as the behavior sequence is generated. The skill level of the controller 34 corresponds to skill that is to be improved by the learning of the autonomous agent.

Using another method, the controller 34 may calculate a value corresponding to the "skill" that is improved as the autonomous agent learns.

Plan achievement Dplan (evaluation value), as an index indicative of how close the autonomous agent is to the goal state, is expressed by equation (10):

$$D_{plan} = \min(|X_{real}(t) - X_{goal}|) \quad (10)$$

The plan achievement is evaluated by a distance in which the execution results of the behavior sequence planned by the planner 33 come closest to the goal state Xgoal.

Using another method, the planner 33 may calculate a value corresponding to the relationship between the execution results of the behavior sequence planned by the planner 33 and the goal state (i.e., relating to whether the execution state and the goal state match each other, how close the execution state comes to the goal state, or how difficult reaching the goal state is).

Predictive error Epred as an index (evaluation value) indicative of the prediction accuracy of the predictor 31 is expressed by equation (11):

$$E_{pred} = \frac{\sum_t |X_{plan}(t) - X_{real}(t)|}{\Delta t} \quad (11)$$

The predictive error is an error between the plan developed based on the prediction and the execution result of the plan. As the predictor 31 gains experience, the predictive error decreases. The predictive error corresponds to the "knowledge" accumulated as the autonomous agent experiences.

Using another method, the predictor 31 may calculate the value corresponding to the "knowledge" accumulated as the autonomous agent gains experience.

The evaluator 32 that acquires the above indexes after the trials of the behavior sequence performs evaluation by comparing one index with a preceding index.

The evaluator 32 monitors variations of the error signals calculated by the predictor 31, the evaluator 32, and the controller 34, thereby determining whether each error tends to decrease or not. If any error decreases with time, namely, with an increase in the number of trials of the planning of the behavior sequence and the execution thereof, the evaluator 32 determines that the current task leads to improvements, and the goal state is maintained to continue the task.

Figure 21:
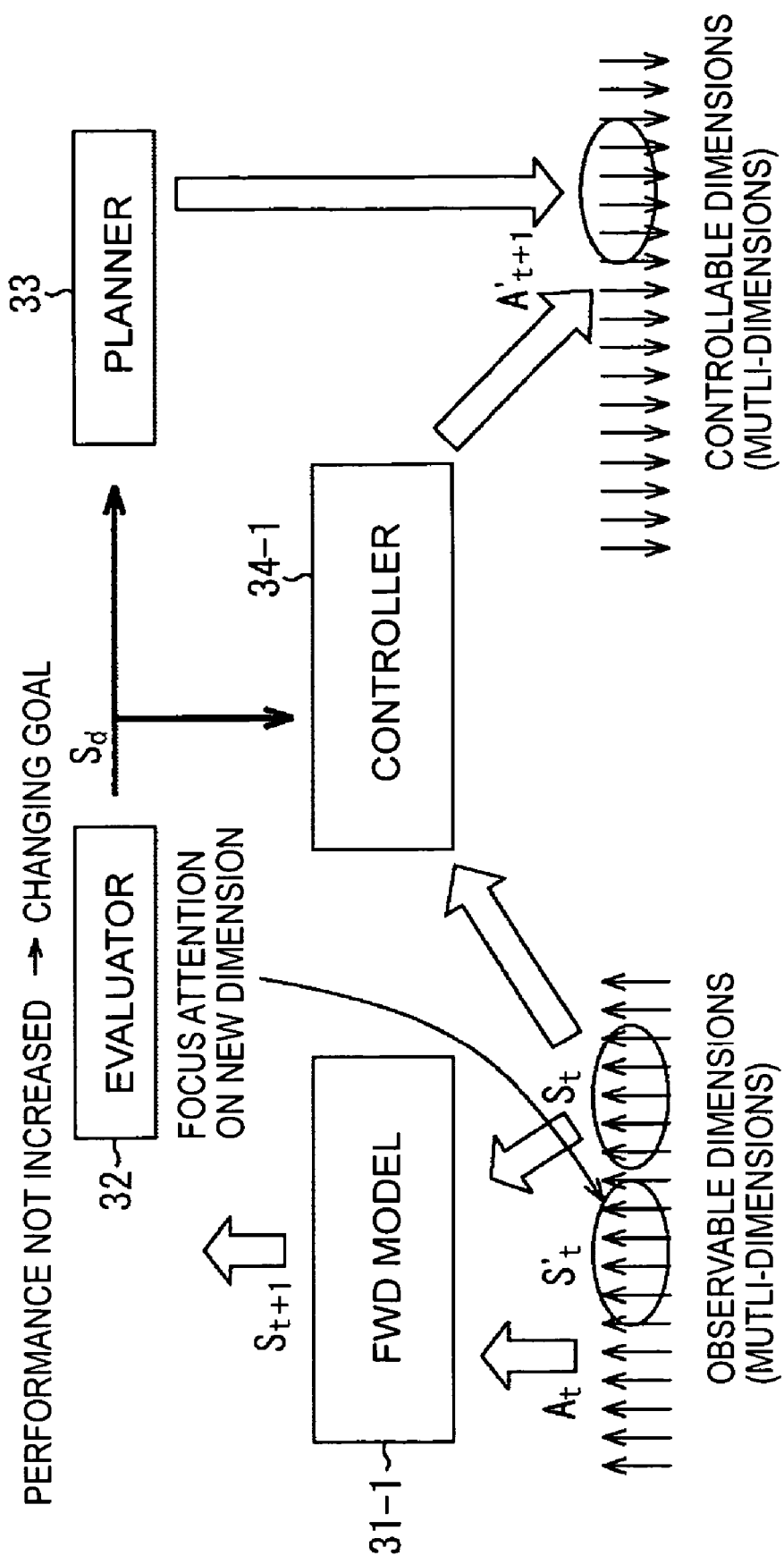
FIG. 21 illustrates another example of the execution flow.

If the evaluator 32 determines that the current task fails to improve performance, the task is quit. As shown in FIG. 21, an input dimension is selected again, and a goal state is set up again.

Figure 22:
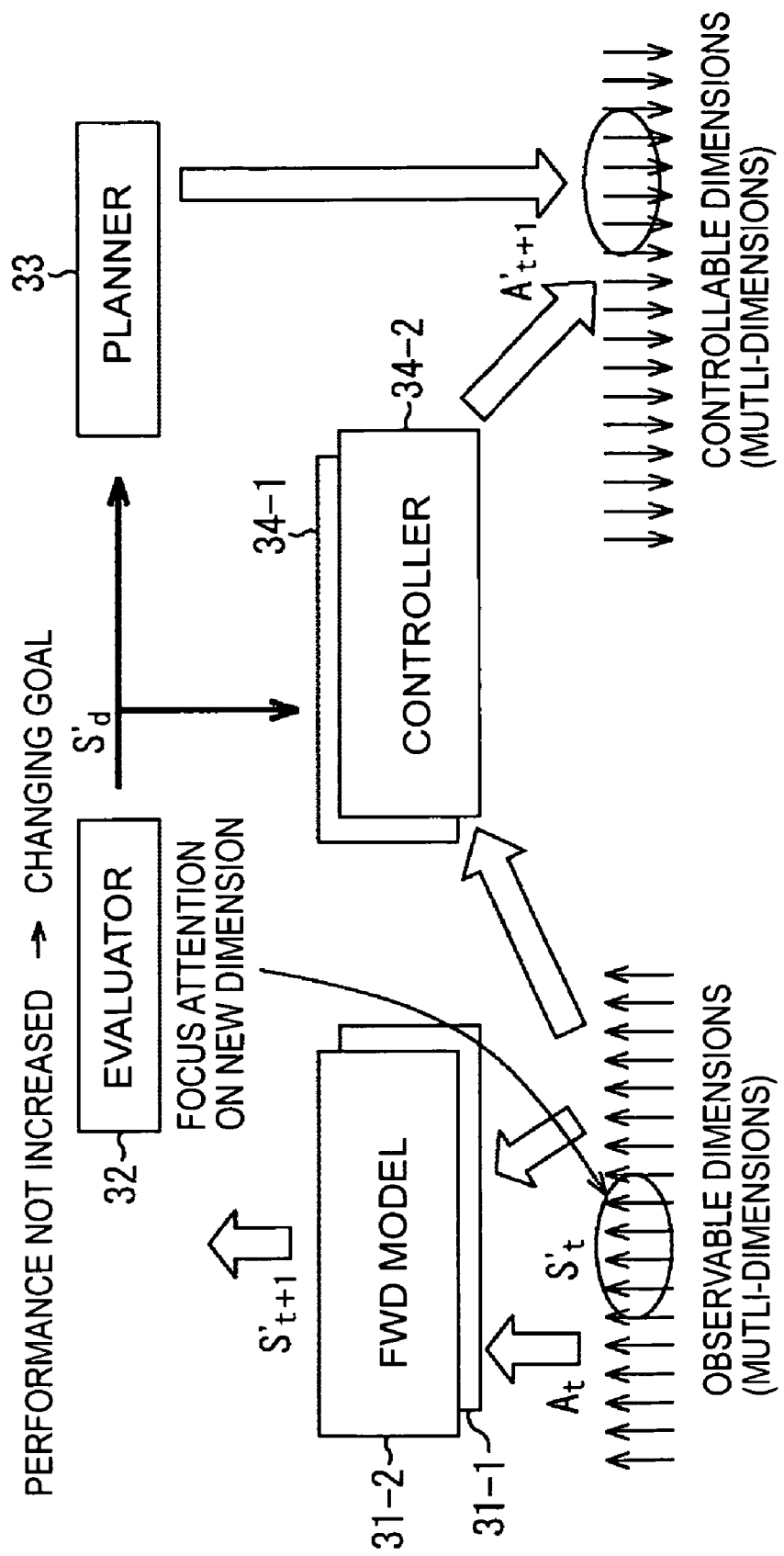
FIG. 22 illustrates yet another example of the execution flow.

If the input dimension is re-selected, the relationship between the goal state and the action achieving the goal state changes. As shown in FIG. 22, the planner 33 generates a behavior sequence using the prediction results provided by a predictor 31-2 corresponding to the new input state and the new goal state. In response to the new input state and the new goal state, a controller 34-2 controls the execution of the behavior sequence. If a successful sequence results, the controller 34-2 learns the successful sequence.

A plurality of predictors 31 and a plurality of controllers 34 are constructed at each relationship between the input state and goal state.

The indexes of FIG. 20 that are obtained when the behavior sequence planned by the planner 33 is executed and a specific example of determination of whether to continue task are described below.

The autonomous agent reaches the goal state when the behavior sequence planned by the planner 33 is executed. The evaluator 32 detects skill Ectrl. If the value of skill Ectrl is improved over the one obtained at a previous trial, the evaluator 32 sets a new goal (goal state) to continue the task, and proceeds to a next trial.

If the autonomous agent fails to reach the goal state when the behavior sequence planned by the planner 33 is executed, the evaluator 32 detects the plan achievement Dplan. If the plan achievement Dplan has improved, in other words, if the state of the autonomous agent comes close to the goal state when the behavior sequence planned by the planner 33 is executed, there is a possibility that a successful sequence is obtained with the current goal setting. The task is continued to a next trial with the same goal setting.

If the autonomous agent neither reaches the goal state nor comes close to the goal state when the behavior sequence planned by the planner 33 is executed, the evaluator 32 detects the predictive error Epred. If the predictive error Epred has improved, there is a possibility that the planner 33 plans a behavior sequence allowing the autonomous agent to come close to the goal state with the continuous learning of the predictor 31. The task is continued to a next trial with the same goal setting.

If any of the above-mentioned cases does not apply, no improvements are expected even if the task is continued, and the evaluator 32 re-selects tasks.

The planner 33 depends on the performance of the predictor 31 because the planner 33 uses the predictor 31. The controller 34 depends on performance of the planner 33 because the controller 34 learns an execution sequence developed by the planner 33. The planner 33 itself has no particular learning function, and the plan achievement of the planner 33 depends on the level of difficulty in problem setting.

Figures 23, 24:
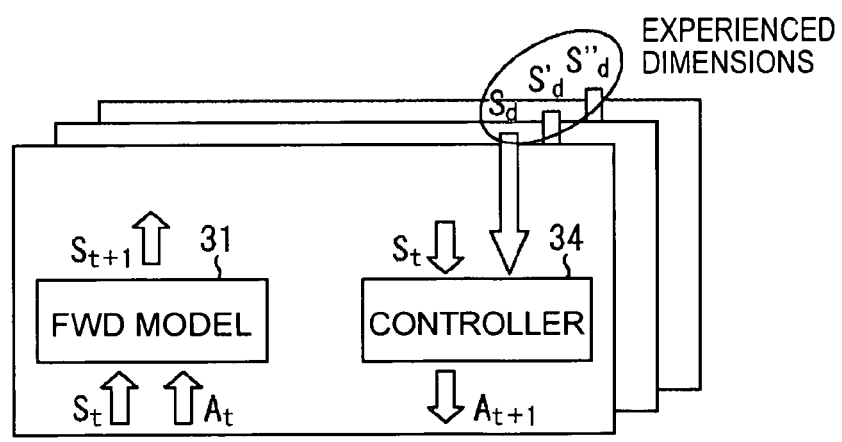
FIG. 23 illustrates a growth phase of a module.
FIG. 24 illustrates generation of a controller.

As shown in FIG. 23, in a typical process, the autonomous agent is transitioned from a phase in which the autonomous agent is inexperienced in terms of prediction, planning, and control to a phase in which a set problem is difficult (selection of the goal state is not appropriate) because planning capability and control accuracy are at a low level though prediction accuracy is improved. By repeating further trials from that phase, planning capability is enhanced. More specifically, the learning of the controller 34 is in progress after undergoing an insufficient skill phase in which the control accuracy is not high enough while the planning capability is enhanced. A resulting controller 34 has thus acquired the "skill" that can comply with any task and solve the problem. On the other hand, if none of the predictor 31, the planner 33 and the controller 34 exhibits progress, growth (progress in learning) may stop at any of the phases of FIG. 23. The evaluator 32 needs to change the task.

The evaluator 32 has the function of selecting the goal input dimension and the function of determining the goal state. If the above-referenced learning is well in progress to one set goal state, the goal state is modified with the goal input dimension maintained to cause the predictor 31 and the controller 34 to learn achievement of the same dimension but a different state. The controller 34 thus performs control process with the state quantity of a dimension being as a parameter.

The learning process is thus continued. As previously discussed with reference to FIGS. 17 and 22, the autonomous agent generates a plurality of controllers 34 that achieve the goal state of a particular dimension, and generates a plurality of predictors 31 corresponding to the controllers 34. As shown in FIG. 24, sufficient experience is gained. In other words, a plurality of pairs of controller 34 and predictor 31 is generated on a per "experienced" dimension basis.

Not only the existing action as the function of the autonomous agent but also an output to the newly acquired controller 34 is added as a candidate of the action dimension to be selected by the planner 33 in the above-mentioned process. When the output to the newly acquired controller 34 is selected as the action dimension by the planner 33, a layer structure of the controller 34 (relationship between the controller 34 and the controller 42 of FIG. 2) is constructed. If an action is provided to the controller 34, an action of the controller 42 at a corresponding hierarchically lower level is generated.

A change in the environment responsive to the action to the controller 42 hierarchically lower than the controller 34 is learned as a predictor 41 having a new input and output relationship. As shown in FIG. 2, at the higher layer, the learning of the predictor 31 and the controller 34 is performed with the goal state of the lower layer controller 42 as an action.

FIG. 25 illustrates the relationship of the input and output variable of the autonomous agent 101 having the arm 131 performing a single-pendulum motion discussed with reference to FIG. 4.

Observed angle $\theta$ and angular velocity $\omega$ are varied by inputting torque $\tau$ as an action, and a change in lactic acid level L is closely related to the torque $\tau$. However, a mere change in the torque $\tau$ does not raise the level of energy E, and energy E is not replenished unless the angle $\theta$ of the arm 131 reaches a predetermined angle. The autonomous agent 101 cannot reach the goal state even if a behavior sequence is simply searched for with the torque $\tau$ being the action dimension for the purpose of raising the energy level.

The process of the autonomous agent 101 having the arm 131 performing a single pendulum motion is described below.

The evaluator 32 selects a goal input dimension. Energy level E (within a range from 0.0 to 1.0) is selected as an input dimension.

The evaluator 32 selects an energy level E of 0.8 as one of goal states of energy E.

The planner 33 selects, as an action dimension, the torque $\tau$ being as only action dimension of the autonomous agent 101 in response to the goal state selected by the evaluator 32. The predictor 31, which has not sufficiently learned, gains through random plans a solution that raises the energy level E to the goal state. The controller 34 controls the execution of the behavior sequence. To raise the energy level E, the arm 131 needs to be tilted up to an upright position ($\theta=\pi$), reaching and staying at the bait 111 ($\omega=0$). It is extremely unlikely that the arm 131 is tilted up and remains balanced at the upright position in the behavior sequence planned by the inexperienced predictor 31. In other words, the execution of the plan fails, unable to reach the goal state (bait 111).

Through failure experiences, the predictor 31 has learned, improving prediction performance thereof. In other words, the predictor 31 learns that the torque $\tau$ is unrelated to energy E. The predictor 31 may gain an accidental experience that the arm 131 is tilted up to the upright position, reaching the bait 111 and raising the energy E. Subsequently, however, the predictor 31 learns, based on the behavior sequence planned in the prediction based on that experience, that reaching the goal state cannot be achieved. As a result, the predictor 31 learns that the relationship between the torque $\tau$ and the energy E fails to work in practice.

When the task is repeated for some time, the planner 33 determines that a behavior sequence for raising the energy level E with the torque $\tau$ cannot be planned. The planner 33 notifies the evaluator 32 that planning capability is improved. This process corresponds to an "anxiety" region stated in the flow theory.

According to the flow theory, humans behave with an objective being an action itself when skill level is balanced with challenge (in a flow state). More specifically, one's capability is expanded in a task in which the one's own skill is balanced with the difficulty of a goal, and the one is expected to indulge oneself in performing the task. If an objective too difficult to achieve is set up, skill may not be improved. If an objective too easy to achieve is set up, skill may not be improved either. Such a skill improvement process is applicable to the problem of a goal setting in an intelligence model of the autonomous agent.

To improve the capability of the autonomous agent in learning, the flow theory is applicable to a goal state setting problem. For example, if skill level is improved, the goal is set to be more difficult, an appropriate plan is selected with a plurality of goals set, and a part of a more difficult plan is adopted as an appropriate plan. When the flow theory is applied, in practice, to the setting of the goal state that allows the capability of the autonomous agent to be improved, it is difficult to normalize the challenge and define the range of flow. As shown in FIG. 26, in the relationship between the skill (skill level of the controller 34) and the challenge, a state in which the level of challenge is high while the skill level is low is defined as a state of "anxiety" with too difficult problem, and a state in which the level of challenge is too low with respect to the skill level is defined as a state of "boredom" with sufficient skill. The evaluator 32 detects those states. For example, if the evaluator 32 detects one of the "anxiety" state and the "boredom" state in the course of learning, the action (task) may be quit.

Upon being notified of the "anxiety" state by the planner 33, the evaluator 32 selects a new input dimension, and sets up a goal state in response to the selected input dimension. The angle $\theta$ is selected as the new input dimension herein, and a predetermined value of the angle $\theta$ is set as the goal state.

Since several behavior sequences and executions thereof are already performed, the predictor 31 responsive to the angle $\theta$ is expected to provide modest prediction performance in a range of past experiences in the state space. Since a behavior sequence having a high accuracy is planned depending on the goal state set by the evaluator 32, it is likely that a successful sequence is obtained.

The evaluator 32 may select the angular velocity $\omega$ and the lactic acid level L as input dimensions. As the angle $\theta$, these input dimensions may be directly predicted with the torque $\tau$ being an action, and the values thereof are manipulated. More specifically, if the three dimensions of angle $\theta$, angular velocity $\omega$, and lactic acid L are selected as input dimensions, the learning of the autonomous agent is intensively performed. If the energy level E is selected as an input dimension, learning fails to progress, and the task is soon quit. Such steps are repeated.

As the learning process is repeated, the lactic acid level L of the three input dimensions of angle θ, angular velocity ω, and lactic acid level L has a simple relationship, in other words, lactic acid level L is increased if torque τ is applied, and decreased if torque τ is set to zero. Skill is thus quickly improved. If lactic acid is selected as an input dimension thereafter, no further process is achieved, and the task (in the "boredom" state of FIG. 26) is immediately quit. More specifically, once a goal lactic acid level is simply given, the controller 34 can select an appropriate action (value of the torque τ) without the planner 33 performing a planning operation (controller 34 acquires sufficient skill with lactic acid level L being set as the input dimension). Learning with lactic acid L being set as the input dimension is thus completed.

The autonomous agent intensively performs the learning process with two remaining dimensions of angle θ and angular velocity ω being input dimensions. As the learning process is repeated, the "boredom" state of FIG. 26 resumes. Once a goal angle θ is simply given, the controller 34 can select an appropriate action (value of the torque τ) without the planner 33 performing a planning operation (the controller 34 with the angle θ being the input dimension acquires sufficient skill). Once a goal angular velocity ω is simply given, the controller 34 can select an appropriate action (value of the torque τ) without the planner 33 performing a planning operation (the controller 34 with the angular velocity ω being the input dimension acquires sufficient skill).

If the energy level E is selected as a goal input dimension after the controller 34 with the angle θ being the input dimension acquires sufficient skill, the planner 33 can select the angle θ as a control dimension. More specifically, the planner 33 with the energy level E as an input dimension selects, as a hierarchically lower controller 42, a controller having learned with the angle θ being the input dimension. There is a causal relationship between the energy level E and the angle θ, and if any past trial shows an experience of raising energy level E, the angle θ for raising the energy level E can be predicted based on that experience.

Based on the prediction, the planner 33 plans a behavior sequence that outputs, as an action, an angle θ=π for raising the energy level E to the hierarchically lower controller 42 having the angle θ as an input dimension, and causes the hierarchically higher controller 34 to perform the behavior sequence.

When the task continues, the controller 34 with the energy level E as an input dimension has sufficient skill to output an angle command value for achieving a goal energy state.

The autonomous agent tends to learn from what is naturally acquired from a relationship found in the environment. Based on the acquired capability, the autonomous agent acquires the controller 34 that has skill to reach a goal state, the goal state being hard to predict or to control from one-to-one input and output relationship.

Using the intrinsic motives, the autonomous agent learns to control a variety of variables and improves skill thereof. Furthermore, the autonomous agent improves performance thereof while performing life-sustaining activities, by combining a function corresponding to an extrinsic motive humans originally have by nature, with the above-described intrinsic motives.

A combination of extrinsic motives is illustrated in FIG. 27.

The autonomous agent can sets a homeostasis function as a particular function (such as the energy level E and the lactic acid L). Homeostasis refers to a mechanism of living matter for maintaining the living matter in a constant state in response to a change in an ambient environment, which can be a stress to the living matter. In the autonomous agent 101 having the arm 131 performing a single pendulum motion discussed with reference to FIG. 4, a homeostasis function is set up as being uncomfortable if energy 1−E is large, and comfortable if energy 1−E is small, and is further set up as being uncomfortable if the lactic acid level L is high, and comfortable if the lactic acid level L is low.

Defined as extrinsic motives are a signal that becomes comfortable at a high energy state, and a signal that becomes uncomfortable in response to a large amount of lactic acid. The autonomous agent is thus provided with a function that improves capability while performing life-sustaining activity. Setting an internal state required to cause a function to work in response to an extrinsic motive and setting innately a goal state are interpreted as setting an extrinsic motive in the designing of the autonomous agent.

The autonomous agent controls a quantity of a state to a "desired level" provided in response to an extrinsic motive while acquiring a manipulation method of the state quantity using an intrinsic motive.

For example, an example of the autonomous agent 101 having the arm 131 performing a single pendulum motion is now considered. The "desired state" is that the energy level is equal to or higher than a predetermined value, and that the lactic acid level is equal to or lower than a predetermined value (i.e., the above-referenced homeostasis function is set up). Control is performed so that that state is maintained, and the learning process is performed using the intrinsic motive. As a result, a manipulation capability for manipulating a state for maintaining the "desired state" is improved.

When selecting a goal input dimension, the evaluator 32 checks that the state quantity responsive to the extrinsic motive (the energy level and the lactic acid level in the example of the autonomous agent 101 having the arm 131 performing a single pendulum motion) is not out of a predetermined state (for example, a state in which the energy level is equal to or higher than a predetermined value and the lactic acid level is equal to or lower than a predetermined value). If the state quantity is out of the state, the evaluator 32 selects a variable of a goal state corresponding to the homeostasis function as an input dimension with a high probability. If the state quantity responsive to the extrinsic motive matches the predetermined state, a goal input dimension is selected based on the intrinsic motive.

In this arrangement, the output of the homeostasis function is linked to an occurring probability of control state based on the extrinsic motive. If an uncomfortability level rises, the variable of the goal state corresponding to the homeostasis function is selected as an input dimension with a high probability.

Softmax selection mechanism represented by equation (12) may be used in the probabilistic selection of the extrinsic motive and the intrinsic motive:

$$P_t(i) = \frac{e^{v_t(i)/\tau}}{\sum_k e^{v_t(k)/\tau}} \qquad (12)$$

The Softmax selection probabilistically selects a behavior based on value. The Softmax selection uses Boltzmann distribution and Gibbs distribution. In equation (12), parameter τ is a positive constant called temperature. The Softmax selection using the Gibbs distribution becomes close to greedy selection for selecting a minimum cost action as the temperature parameter is small, and becomes close to a random selection as the temperature parameter is large.

In equation (12), Pt(i) represents a probability selecting an i-th motive. Here, vt(i) indicates a priority of the i-th motive at time t, and determined by the magnitude of the state quantity in the extrinsic motive. For example, vt(i) may be represented by equation (13) so that the priority of the energy level becomes higher when the energy level is low.

$$v_t(i)=1-E_t \qquad (13)$$

When a variable of the goal state related to an extrinsic motive is selected as an input dimension, the evaluator 32 sets, as the goal state, a preferred innate state (the most preferable state contained in the "desired states") and provides the goal state to the planner 33.

In the autonomous agent 101 having the arm 131 performing a single pendulum motion, the homeostasis function is set up as being uncomfortable if energy 1-E is large, and comfortable if energy 1-E is small, and is further set up as being uncomfortable if the lactic acid level L is high, and comfortable if the lactic acid level L is low. In such a case, the evaluator 32 sets the homeostasis function =0.0 (comfortable state) for the goal state as a desired state.

If the planner 33 quickly plans and executes the behavior sequence reaching the behavior sequence corresponding to the "desired state", the task falls within the "boredom" region, and is deselected.

If the behavior sequence reaching the goal state cannot be planned, or if the planned behavior sequence cannot be executed, the task falls within the "anxiety" region. Even if the trials are performed in the current state, no improvements are achieved. The evaluator 32 gives up this task, and takes a different action through the intrinsic motive. This situation is analogous to a situation in which a hungry animal preferably takes any action rather than taking no action at all because taking any action still provides a chance of encountering a bait.

Taking the action with the above arrangement provides the following advantages.

(1) Without prior knowledge relating to the task, the autonomous agent can learn to improve the capability thereof. More specifically, the autonomous agent having the above-referenced arrangement can flexibly perform any task.

(2) The autonomous agent can learn alone without human intervention for setting a goal and an evaluation function, and selecting a state variable.

(3) The autonomous agent can solve a complex problem by combining simple problems as sub-goals.

(4) The autonomous agent can acquire more and more knowledge (predictor 31) and skill (controller 34).

Referring to a flowchart of FIG. 28, a first process executed by the autonomous agent of one embodiment of the present invention is described below.

In step S1, the predictor 31 selects a task. The predictor 31 selects a variable to be set as a goal state (goal input dimension) from among a large number of variables.

In step S2, the planner 33 determines whether an unselected action remains in the selected task. If it is determined that no unselected action remains in the selected task, processing returns to step S1 to select a new task and then to repeat subsequent steps.

If it is determined in step S2 that an unselected action still remains in the selected task, the planner 33 selects an action from the unselected actions in step S3.

In step S4, the evaluator 32 sets a goal state based on the selected task, and notifies the planner 33 of the goal state.

In step S5, the planner 33 plans a behavior sequence to reach a goal requested by the evaluator 32, based on a function of a difference equation for the predictor 31 to predict each variable at time (t+1) from a variable at time t in the above-mentioned equations (1) through (4), and then supplies the behavior sequence to the controller 34.

More specifically, as described with reference to FIGS. 8 and 9A-9D, the planner 33 determines a next state when all actions available from the current state are taken in accordance with the previously mentioned A* search algorithm. A link is made from the current node to that state as a new node. If the link destination is equal to or close to another already reached state, arrival costs to those nodes are compared. A low-cost node remains while a high cost node is discarded. If the new node is generated in this way, the evaluation function of equation (5) is calculated. The new node is added to node candidates (preceding nodes remaining). A node having the lowest evaluation function is selected from all candidate nodes, namely, the most likely path is selected as a current node, and the selected node is deselected from the node candidates.

If the selection of the task and the selection of the action are appropriate, a search process based on the A* search algorithm is completed when any of the node candidates equals the goal state or comes sufficiently close to the goal state after repeating searching, and a plan is determined.

In step S6, the planner 33 determines whether a plan reaching a goal could be generated. If it is determined in step S6 that a plan reaching a goal could not be generated, processing returns to step S2 to repeat step S2 and subsequent steps. More specifically, if a different action is selected or no different action remains in step S2, steps S1 through S6 are repeated until a plan reaching a goal is generated with a different task selected and with a goal state set again.

If it is determined in step S6 that a plan enabled to reach a goal is generated, the controller 34 starts executing the behavior sequence planned by the planner 33 in step S7. More specifically, if the autonomous agent 101 has the arm 131 of FIG. 5, the controller 34 controls the motor driver 152 to drive the DC motor 132 to apply torque to the arm 131 for rotation in a desired direction, based on the behavior sequence planned by the planner 33. The behavior sequence includes at least one action.

In step S8, the predictor 31 acquires and records information indicating an environment that has been changed in response to the execution of the plan in step S7 (for example, the information regarding an environment $S_t$ changed in response to an executed action $a_t$). More specifically, if the autonomous agent 101 has the arm 131 of FIG. 5, the predictor 31 observes an angle θ of the arm 131 in a signal from the arm 131, detects an angular velocity ω from the angle θ, and records the angle θ and the angular velocity ω. The predictor 31 calculates and records changes in the energy level E and the lactic acid level L, previously discussed with reference to FIG. 4, based on a power consumption value supplied from the power meter 153. In response to an input from the photosensor 135, the planner 33 detects that the autonomous agent 101 has acquired the bait 111 at a predetermined position θE.

In step S9, the predictor 31 learns the behavior and the change in the state of the environment. More specifically, the predictor 31 learns the change in the state of the environment, namely, the output responsive: to the input represented by the difference equations expressed by equations (1) through (4), in response to the action executed under the control of the controller 34.

In step S10, the controller 34 determines whether the execution of the behavior sequence planned by the planner 33 has been completed, in other words, whether all actions contained in the behavior sequence have been executed. If it is determined in step S10 that the execution of the behavior sequence has not been completed, processing returns to step S8 to repeat step S8 and subsequent steps.

If it is determined in step S10 that the execution of the behavior sequence has been completed, the controller 34 determines in step S11 whether the goal has been reached. More specifically, if the autonomous agent 101 has the arm 131 of FIG. 5, the controller 34 determines whether the arm 131 reaches and becomes standstill at the location of the bait 111 (i.e., whether the end of the arm 131 reaches and becomes standstill at the location of the photosensor 135 of FIG. 3 or the location of the conductive terminal 163 of FIG. 5).

If it is determined in step S11 that the goal has been reached, in other words, the plan has been successfully executed, the controller 34 learns the successful sequence in step S12.

If it is determined in step S11 that the goal has not been reached, or subsequent to step S12, the predictor 31 calculates the predictive error, the controller 34 calculates the control error, and the planner 33 calculates' the planning error in step S13. The errors are supplied to; the evaluator 32.

The indexes expressed by the above-referenced equations (9) through (11) are used as the error information supplied from the predictor 31, the planner 33, and the controller 34.

In step S14, the evaluator 32 determines whether capability has been improved, based on the predictive error supplied from the predictor 31, the control error supplied from the controller 34, and the planning error supplied from the planner 33. In other words, the evaluator 32 determines any of the errors indicated by the error information supplied from the predictor 31, the planner 33, and the controller 34 is reduced. If it is determined in step S14 that capability is not improved, the evaluator 32 determines that capability improvement is not expected even if the task is further repeated. Processing returns to step S1 to select a new task and repeat the subsequent process steps.

If it is determined in step S14 that capability has been improved, the evaluator 32 determines in step S15 whether the goal has been reached using the behavior sequence stated in step S7 (the same determination as the one performed in step S11).

If it is determined in step S15 that the goal has been reached, processing returns to step S4 to repeat step S4 and subsequent steps. If the above learning process is successfully in progress in one goal state, the goal state is changed with the goal input dimension maintained so that a different state achievement may be learned in the same dimension. In this way, the planner 33 performs control process with the state quantity of the dimension as being a parameter.

If it is determined in step S15 that the goal has not been reached, processing returns to step S5 to repeat step S5 and subsequent steps. More specifically, if the goal has not been reached, the planner 33 plans a behavior sequence based on the prediction of the predictor 31. The predictor 31 has already learned the input and output in the execution of the failed plan. A plan developed by the planner 33 based on the prediction of the predictor 31 is different from the preceding plan even if the plan is developed for the same goal. The new plan closer to success is thus generated. When steps S2 through S10 are repeated to reach the goal, the predictor 31 learns more, and as previously discussed with reference to FIG. 10, a successful sequence is obtained.

In the autonomous agent, the predictor 31 and the controller 34 have advanced in learning without human intervention for setting the goal and the evaluation function and for selecting the goal state. Finally, the controller 34 has obtained a successful sequence. A controller having a function capable of generating the evaluation behavior sequence equivalent to the behavior; sequence (control function to be executed by the controller 34) is acquired.

In addition to a successful sequence, the controller 34 may learn a failed sequence with a reached state replaced with a goal state.

Figure 29:
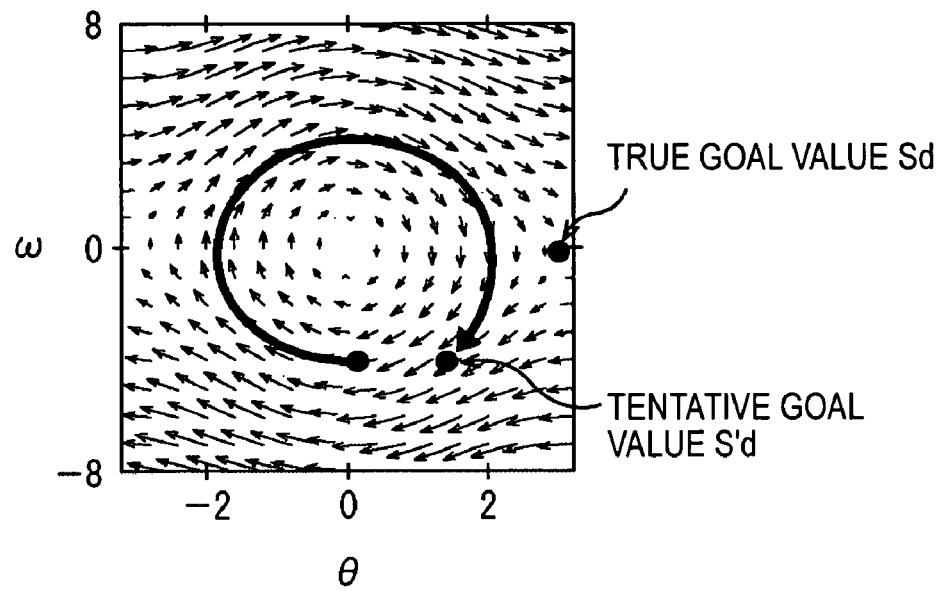
FIG. 29 illustrates a true goal and a tentative goal.

When a failed sequence rather than a successful sequence is obtained, the controller 34 can learn a function g of one of equations (6) and (8) using the results of the failed sequence. More specifically, as shown in FIG. 29, the controller 34 sets the state reached as a result of a failed sequence as a "tentative goal value S'd" different from a "true goal value Sd". Based on the assumption that the state transition to the tentative goal value S'd is originally intended, the controller 34 performs supervised learning on a function g that is obtained from a supervisor. The supervisor herein includes state St at time t, the tentative goal state S'd, and actions $a_{t+1}$ (t=1, 2, ..., T) obtained from the failed sequence.

If the concept of the tentative goal value S'd is generalized, not only the final arrival state of the sequence but also any midway point in the middle of the sequence are treated as goal a value. Experienced reinforcement learning is performed with all experienced states being goal values if a supervisor includes states and behavior sequences prior to a tentative goal value in the middle of sequence.

Even if a state that has never been a goal state is set, the autonomous agent improves control capability. In comparison with the learning process that has been performed using the successful sequences only, the speed of learning process is increased.

The evaluator 32 selects an action from among all available actions. In the process of a trial, the flow theory is used to select chiefly actions that assure continuity of learning. In contrast, the evaluator 32 may select an action based on the correlation and causal relationship of the variables.

Figure 30:
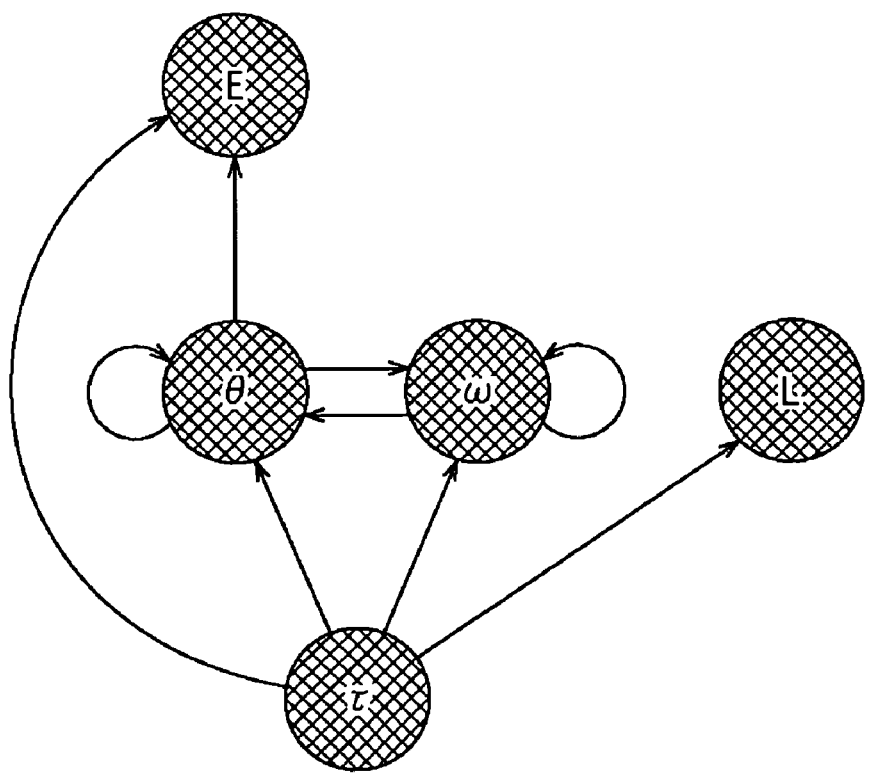
FIG. 30 illustrates a causal diagram at an autonomous agent.

FIG. 30 illustrates a causal diagram of the causal relationship of the variables of the autonomous agent 101 discussed with reference to FIG. 4.

Finding a qualitative causal relationship between the variables is interpreted as determining the cause of a movement of an object when one tries predicting the movement of the object. In practice, one can focus on several events from the infinite number of elements forming the world, and can understand (discover) a cause of an object to be predicted. Information used in such a case is time-series information of an event (variable) obtained through observing an environment.

If information relating to the causal relationship is not used, all variables are treated as inputs to the predictor 31 as represented by equations (1) through (4).

Selection of a variable serving as an input to function f is considered. In one method, a plurality of combinations of variables as inputs is generated as hypotheses, and a hypothesis having the smallest predictive error is selected. For example, a function expressed by equation (14) is considered as a hypothesis predicting an angle θ.

$$\dot{\theta}=f_\theta\,(\cdot)\ \dot{\theta}=f_\theta(\theta, \omega, \tau)$$

$$\dot{\theta}=f_\theta(\theta)\ \dot{\theta}=f_\theta(\theta, \omega, E, L)$$

$$\dot{\theta}=f_\theta\,(\theta, \omega)\ \dot{\theta}=f_\theta(\theta, \omega, E, L, \tau) \quad (14)$$

Equation (14) is part of the contemplated hypothesis. Since the number of variables in equation (14) is five, 121 combinations are considered.

If summing up all combinations from a case with no input variable at all incorporated to a case with all variables incorporated, 121 combinations are possible. With this arrangement, the number of combinations explosively increases as the number of variables increases. An upper limit should be imposed on the number of combinations.

Function approximation is performed on the hypotheses with the same training samples provided. Any method may be used in function approximation. Learning herein is performed using support vector regression (SVR). The SVR guarantees that a global solution is usually obtained, and is more reliably used than a neural network error back propagation method widely used.

The structure of the function f is determined on a per hypothesis basis in learning using SVR. How good prediction each hypothesis performs is evaluated based on an evaluation sample different from the training sample. This method is used to determine a generalization error corresponding to prediction performance, and referred to as "cross validation". Although any other evaluation criteria may be used, the evaluation method must determine the generalization error rather than training error. When a hypothesis providing the best evaluation is selected, and learning process has sufficiently progressed, a correct causal relationship is obtained.

For example, changing the value of one variable to any predetermined value is now desired. If no direct intervention to that variable is possible, an indirect intervention to a variable other than that variable is contemplated. For example, one cannot move a position of an object (a chair, for example) by thinking only, but can constrict muscles of his own. By directly constricting muscles, one can control his own body, thereby changing the position of the object after all.

An autonomous agent is considered. A variable that can be directly manipulated by the autonomous agent is torque $\tau$. The energy E, if reduced, cannot be directly replenished by manipulating the torque $\tau$. The autonomous agent needs to raise indirectly the energy level E by varying the torque $\tau$. The causal relationship of FIG. 30 is now detected. The autonomous agent is free from trials that are required before learning that the energy E is not directly replenished by manipulating the torque $\tau$, and recognizes that an angle $\theta$ is simply controlled in response to the torque $\tau$ (using the hierarchically lower controller 42).

Figure 28:
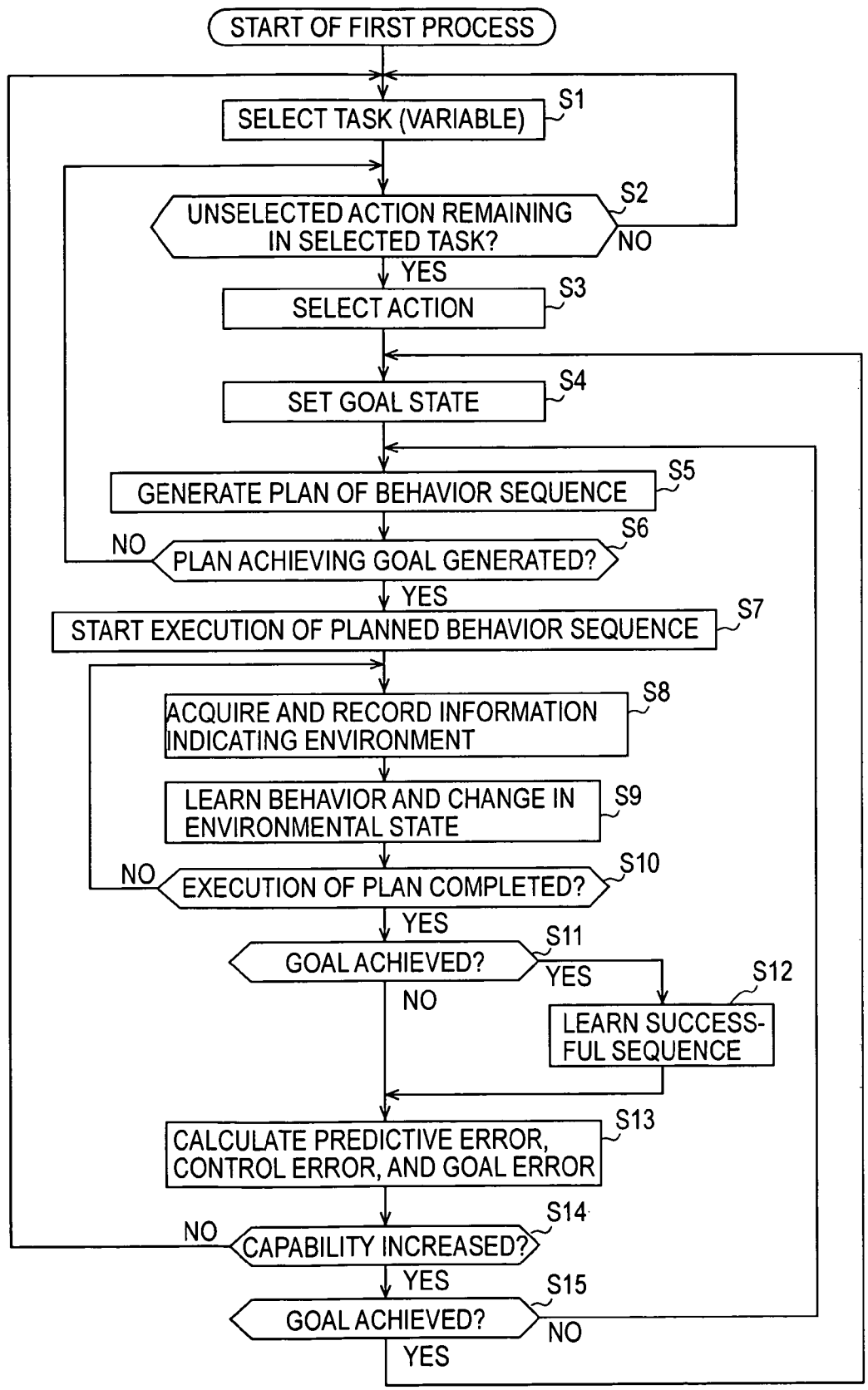
FIG. 28 is a flowchart illustrating a first process.

By selecting the action based on the correlation and the causal relationship of the variables, failure to generate the behavior sequence reaching the goal discussed with reference to FIG. 28 is prevented.

Figure 31:
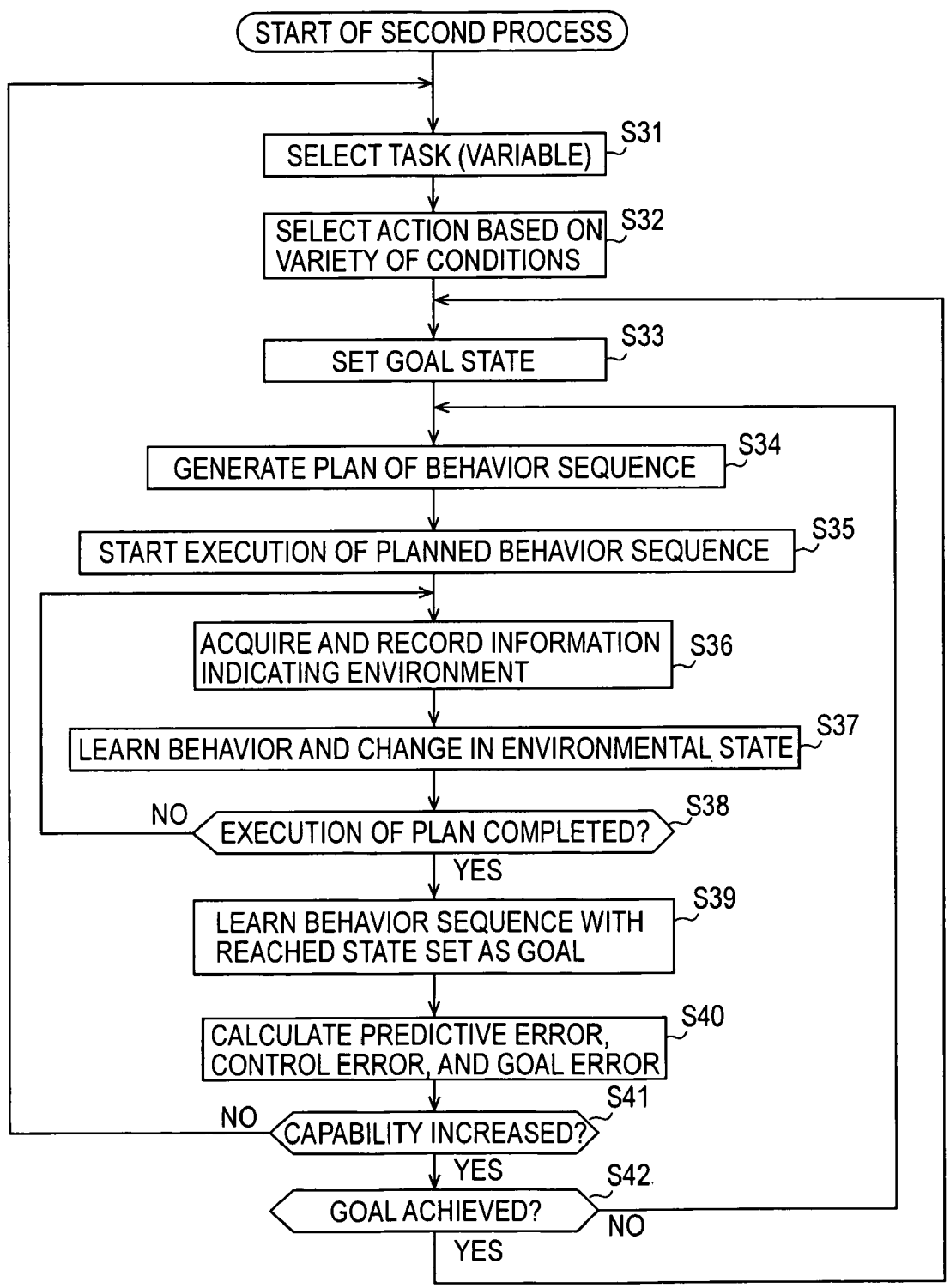
FIG. 31 is a flowchart illustrating a second process.

FIG. 31 is a flowchart illustrating a second process of the autonomous agent that selects actions based on the correlation and causal relationship of the variables.

In step S31, the predictor 31 selects a task. More specifically, the predictor 31 selects a variable set as a goal state (goal input dimension) from among many variables.

In step S32, the planner 33 selects an action based on a variety of conditions corresponding to the causal relationship of the variables discussed with reference to FIG. 30.

In step S33, the evaluator 32 sets a goal state based on the selected task, and notifies the planner 33 of the set goal state.

In step S34, the planner 33 plans a behavior sequence to reach a goal requested by the evaluator 32, based on a function of a difference equation for the predictor 31 to predict each variable at time (t+1) from a variable at time t in the above-mentioned equations (1) through (4), and then supplies the planned behavior sequence to the controller 34.

More specifically, as described with reference to FIGS. 8 and 9A-9D, the planner 33 searches to plan the behavior sequence in accordance with the previously mentioned A* search algorithm. When any of node candidates equals or comes sufficiently close to the goal state through repeating searching, the searching operation based on the A* search algorithm quits, and the plan is determined.

Steps S35 through S38, respectively analogous to steps S7 through S10 of FIG. 28, are performed. More specifically, the controller 34 start executing the behavior sequence planned by the planner 33. The predictor 31 acquires and records information indicating an environment that has been changed in response to the execution of the plan in step S35 (for example, the information regarding an environment $S_t$ changed in response to an executed action $a_t$).

The predictor 31 learns the behavior and the change in the state of the environment. The controller 34 determines whether the execution of the behavior sequence planned by the planner 33 has been completed, in other words, whether all actions contained in the behavior sequence have been executed. If it is determined that the execution of the behavior sequence has not been completed, processing returns to step S36 to repeat step S36 and subsequent steps.

If it is determined in step S38 that the execution of the behavior sequence has been completed, the controller 34 replaces a reached state with the goal state in step S39 regardless of whether the goal has been reached, as previously discussed with reference to FIG. 29. The controller 34 thus learns the behavior sequence.

Steps S40 through S42, respectively analogous to steps S13 through S15 of FIG. 28, are performed. More specifically, the predictor 31 calculates the predictive error, the controller 34 calculates the control error, and the planner 33 calculates the planning error, and the errors are supplied to the evaluator 32. The evaluator 32 determines whether capability has been improved, based on the predictive error supplied from the predictor 31, the control error supplied from the controller 34, and the planning error supplied from the planner 33. If it is determined that capability is not improved, the evaluator 32 determines that capability improvement is not expected even if the task is further repeated. Processing returns to step S31 to select a new task and repeat the subsequent process steps. If it is determined that capability is improved, the evaluator 32 determines that the executed behavior sequence has been reached.

If it is determined that the goal has been reached, processing returns to step S33 to repeat step S33 and subsequent steps. If it is determined that the goal has not been reached, processing returns to step S34 to repeat step S34 and subsequent steps.

In the autonomous agent, without human intervention for setting the goal and the evaluation function and for selecting the goal state, the predictor 31 and the controller 34 have advanced in learning by selecting efficiently the action based on the causal relationship of the variables. Even if no successful sequence is obtained, a reached state is replaced with the goal state to cause the controller 34 to advance in learning in the autonomous agent.

Finally, the controller 34 has obtained a successful sequence. A controller having a function capable of generating the evaluation behavior sequence equivalent to the behavior sequence (control function to be executed by the controller 34) is acquired.

Figure 32:
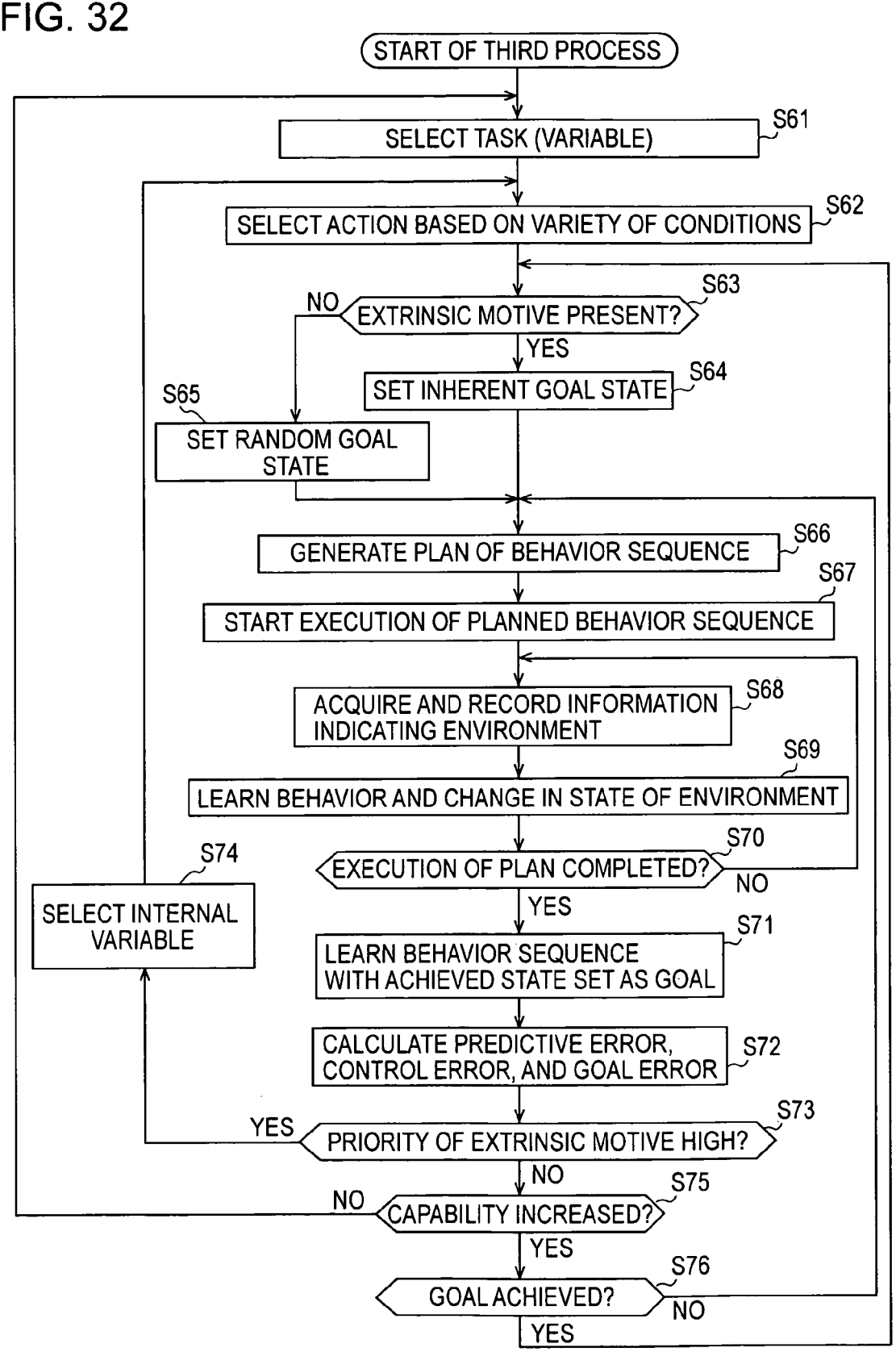
FIG. 32 is a flowchart illustrating a third process.

FIG. 32 is a flowchart illustrating a third process performed by the autonomous agent that controls the behavior based on an extrinsic motive.

In step S61, the predictor 31 selects a task. More specifically, the predictor 31 selects a variable set as a goal state (goal input dimension) from among many variables.

In step S62, the planner 33 selects an action based on a variety of conditions corresponding to the causal relationship of the variables.

In step S63, the evaluator 32 determines whether an extrinsic motive has been set.

If it is determined in step S63 that an extrinsic motive has been set, the evaluator 32 sets, in step S64, a goal state based on an innate goal state, namely, a goal state based on the previously described homeostasis function.

If it is determined in step S63 that no extrinsic motive has been set, the evaluator 32 sets a goal state in a random fashion in step S65.

Subsequent to one of steps S64 and S65, steps S66 through S72, respectively analogous to steps S34 through S40 of FIG. 31, are performed.

More specifically, the controller 34 plans a behavior sequence to reach the goal requested by the evaluator 32, based on the function of the difference equation predicted by the predictor 31, and supplies the behavior sequence to the controller 34. The controller 34 starts executing the behavior sequence planned by the planner 33. The predictor 31 acquires and records information indicating an environment that has been changed in response to the execution of the plan in step S65 (for example, the information regarding an environment $S_t$ changed in response to an executed action $a_t$). The predictor 31 learns the behavior and the change in the state of the environment. The controller 34 determines whether the execution of the behavior sequence planned by the planner 33 has been completed, in other words, whether all actions contained in the behavior sequence have been executed. If it is determined that the execution of the behavior sequence has not been completed, processing returns to step S68 to repeat step S68 and subsequent steps. If it is determined that the execution of the behavior sequence has been completed, the controller 34 replaces a reached state with the goal state regardless of whether the goal has been reached, as previously discussed with reference to FIG. 29. The controller 34 thus learns the behavior sequence. The predictor 31 calculates the predictive error, the controller 34 calculates the control error, and the planner 33 calculates the planning error, and the calculated errors are supplied to the evaluator 32.

In step S73, the evaluator 32 determines whether the priority of the extrinsic motive is high or not. Whether to use an extrinsic motive or an intrinsic motive in the selection of the variable may be determined base on the Softmax selection mechanism discussed with reference to equation (12). If vt(i) representing the priority of an i-th motive at time t is set as represented by equation (13), the priority of the extrinsic motive becomes high when the value of the homeostasis function set as the extrinsic motive becomes uncomfortable.

If it is determined in step S73 that the priority of the extrinsic motive is high, the evaluator 32 selects and sets input and output variables in step S74 so that the variable set as the homeostasis function is transitioned from the uncomfortable state to the comfortable state (desired state). Processing returns to step S62 to repeat step S62 and subsequent steps with a selected variable.

If it is determined in step S73 that the priority of the extrinsic motive is not high, steps S75 and S76, respectively analogous to steps S41 and S42 of FIG. 31, are performed. More specifically, the evaluator 32 determines whether capability has been improved, based on the predictive error supplied from the predictor 31, the control error supplied from the controller 34, and the planning error supplied from the planner 33. If it is determined that capability is not improved, the evaluator 32 determines that capability improvement is not expected even if the task is further repeated. Processing returns to step S61 to select a new task and repeat step S61 and subsequent process steps. If it is determined that capability is improved, the evaluator 32 determines that the goal has been reached. If it is determined that the goal has been reached, processing returns to step S63 to repeat step S63 and subsequent steps. If it is determined that the goal has not been reached, processing returns to step S66 to repeat step S66 and subsequent steps.

In the autonomous agent, without human intervention for setting the goal and the evaluation function and for selecting the goal state, the predictor 31 and the controller 34 have advanced in learning by selecting efficiently the action based on the causal relationship of the variables. The autonomous agent maintains the self-preservation in response to the extrinsic motive while continuing learning. Even if no successful sequence is obtained, a reached state is replaced with the goal state to cause the controller 34 to advance in learning in the autonomous agent.

Finally, the controller 34 has obtained a successful sequence. A controller having a function capable of generating the evaluation behavior sequence equivalent to the behavior sequence (control function to be executed by the controller 34) is acquired.

In accordance with the embodiment of the present invention, the evaluator 32 sets appropriately a state as a goal without human intervention for setting the goal and the evaluation function and for selecting the goal state. The predictor 31 successively learns the input and output relationship of the agent, the planner 33 searches a particular path to the goal state using the prediction of the predictor 31, and the controller 34 learns the path pattern. The agent thus heuristically acquires the controller 34 that automatically reaches from any state to the goal.

In other words, the predictor 31 constantly learns the relationship between the action taken by the predictor 31 and a change in an environment (sensor), and the planner 33 plans by rehearsing the predictor 31 from the current state of the planner 33 to the goal state. The controller 34 controls the execution of the planned behavior while learning the input and output relationship of the behavior. The predictor 31 is improved even if an erroneous plan is executed. The function approximator of statistic learning (such as support vector regression) is used in predictive learning and control learning. The planner 33 uses a heuristic search technique (such as A* search).

In a manner free from the number of dimensions, predictive learning is performed using the capability of the function approximator that accommodates a large-scale sample and high dimension input. When an erroneous plan developed by an inexperienced predictor 31 is executed, the predictor 31 experiences an unfamiliar state space, and is thus improved.

Even if the state space becomes large as a result of an increase in the number of dimensions, the use of the heuristic search technique prevents a combination explosion of searches, the combination explosion can occur in Q learning or dynamic programming. When the successful sequence is learned, the controller 34 is generalized.

Control with the goal state being as a continuous quantity parameter is learned. Furthermore, learning matching the way of human thinking is performed. A behavior pattern easily understood by humans is generated.

In accordance with embodiments of the present invention, the autonomous agent learns alone to improve the capability;

thereof without prior knowledge of the task. The autonomous agent having the above-referenced structure can flexibly perform any task.

The autonomous agent of embodiments of the present invention learns alone without human intervention for setting the goal and the evaluation function and selecting the state variable. To solve a complex problem, the autonomous agent construct a simple problem as a sub-goal, and then acquires knowledge (predictor 31) and skill (controller 34) for solving the complex problem.

The autonomous agent of embodiments of the present invention maintains an alive state using the extrinsic motive while continuing to learn.

The autonomous agent of embodiments of the present invention sets the tentative goal discussed with reference to FIG. 29. Even if no successful sequence results, control is learned. By determining the correlation of the variables discussed with reference to FIG. 30, an action dimension enabled to progress efficiently learning is selected with priority.

The above-referenced series of process steps may be performed in hardware or software. A program of the software may be installed from a recording medium onto computer built in dedicated hardware or a general-purpose personal computer enabled to perform a variety of functions.

As shown in FIG. 6, the recording medium includes the removable medium 143 distributed to a user separate from a computer to provide the user with the program. The recording media include, for example, a magnetic disk (including a flexible disk), an optical disk (such as compact disk read-only memory (CD-ROM)), or digital versatile disk (DVD)), and magneto-optical disk (such as mini-disk (MD®)

The process steps describing the program stored on the recording medium may be performed in the time-series order sequence as previously stated. Alternatively, the process steps may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A learning control hardware apparatus including a processor for controlling a learning operation of an apparatus configured to sense a state of an environment and select a behavior based on the sensed content, comprising:
    means for predicting learning of a behavior and a change in the state of the environment, and predicting a change in the state of the environment in response to a predetermined behavior;
    an evaluation unit configured to set a goal state in the behavior;
    means for planning a behavior sequence from a current state to the goal state set by the evaluation unit based on a prediction of the means for predicting; and
    means for controlling the behavior in the behavior sequence planned by the means for planning and learning an input and output relationship in the behavior, wherein
    the means for predicting calculates first information relating to a prediction accuracy based on learning, and transmits the first information to the evaluation unit,
    the means for planning calculates second information corresponding to an index that indicates whether the behavior based on the behavior sequence controlled by the means for controlling comes close to the goal state, and transmits the second information to the evaluation unit,
    the means for controlling calculates third information relating to a progress of learning of the input and output relationship, and transmits the third information to the evaluation unit, and
    the evaluation unit sets the goal state based on the first information, the second information, and the third information that was transmitted, and sets a new previously unlearned goal state for a new learning operation once the goal state is successfully achieved.

2. The learning control apparatus according to claim 1, wherein the evaluation unit modifies the goal state based on the first information, the second information and the third information if none of the accuracy of the prediction calculated by the means for predicting, the index calculated by the means for planning, and the progress of the learning calculated by the means for controlling shows any improvement.

3. The learning control apparatus according to claim 1, wherein the evaluation unit selects at least one of variables indicating the state of the environment, sets a predetermined numerical value condition at the selected variable, and if the selected variable fails to satisfy the predetermined numerical value condition in the state of the environment, sets a goal state in which the selected variable satisfies the predetermined numerical condition.

4. The learning control apparatus according to claim 1, wherein the means for planning notifies the evaluation unit that the means for planning has failed to plan the behavior sequence if the means for planning has failed to plan the behavior sequence based on the prediction of the means for predicting, and
    wherein the evaluation unit modifies the goal state if the evaluation unit has received the notification from the means for planning that the planning of the behavior sequence has failed.

5. The learning control apparatus according to claim 1, wherein if the goal state has been reached through the behavior based on the behavior sequence planned by the means for planning, the means for controlling learns the input and output relationship in the behavior.

6. The learning control apparatus according to claim 5, wherein if the goal state has not been reached through the behavior based on the behavior sequence planned by the means for planning, the means for controlling learns the input and output relationship in the behavior with a reached state replaced with the goal state.

7. The learning control apparatus according to claim 1, wherein the means for planning plans the behavior sequence, the behavior sequence selecting a second variable having a high correlation with a first variable indicating the goal state set by the evaluation unit, and the behavior sequence reaching the goal state by controlling the selected second variable.

8. A learning control method implemented by a computer, including a processor, that has been programmed with instructions that cause the computer to control a learning operation of an apparatus sensing a state of an environment and selecting a behavior based on the sensed content, comprising:
    learning the behavior and a change in the state of the environment;
    setting a goal state in the behavior and storing the goal state in a memory;
    planning a behavior sequence from a current state to the goal state set in the setting using a prediction based on the learning;
    controlling the behavior in the behavior sequence planned in the planning;

learning an input and output relationship between the behavior controlled in the controlling and the environment corresponding to the behavior;

calculating first information relating to a prediction accuracy based on the learning, second information corresponding to an index that indicates whether the behavior based on the behavior sequence controlled in the controlling comes close to the goal state, and third information relating to a progress of learning of the input and output relationship;

determining, based on the first information, the second information, and the third information calculated in the calculating whether the goal state is to be set again or not; and setting the goal state based on the first information, the second information, and the third information; and setting a new previous unlearned goal state for a new learning operation once the goal state is successfully achieved.

9. A computer-readable medium including computer executable instructions, wherein the instructions, when executed by a processor, cause the processor to perform a method for controlling a learning operation of an apparatus sensing a state of an environment and selecting a behavior based on the sensed content, the method comprising:

learning the behavior and a change in the state of the environment;

setting a goal state in the behavior;

planning a behavior sequence from a current state to the goal state set in the setting using a prediction based on the learning;

controlling the behavior in the behavior sequence planned in the planning;

learning an input and output relationship between the behavior controlled in the controlling and the environment corresponding to the behavior;

calculating first information relating to a prediction accuracy based on the learning, second information corresponding to an index that indicates whether the behavior based on the behavior sequence controlled in the controlling comes close to the goal state, and third information relating to a progress of learning of the input and output relationship;

determining, based on the first information, the second information, and the third information calculated in the calculating, whether the goal state is to be set again or not; and setting the goal state based on the first information, the second information, and the third information, and setting a new previously unlearned goal state for a new learning operation once the goal state is successfully achieved.

10. A learning control apparatus for controlling a learning operation of an apparatus sensing a state of an environment and selecting a behavior based on the sensed content, comprising:

a predicting unit configured to learn the behavior and a change in the state of the environment, and predicting a change in the state of the environment in response to a predetermined behavior;

a goal state setting unit configured to set a goal state in the behavior;

a planning unit configured to plan a behavior sequence from a current state to the goal state set by the goal state setting unit based on a prediction of the predicting unit; and a control unit configured to control the behavior in the behavior sequence planned by the planning unit and configured to learn an input and output relationship in the behavior, wherein the predicting unit calculates first information relating to an prediction accuracy based on learning, and supplies the first information to the goal state setting unit, the planning unit calculates second information corresponding to an index that indicates whether the behavior based on the behavior sequence controlled by the control unit comes close to the goal state, and supplies the second information to the goal state setting unit, the control unit calculates third information relating to a progress of learning of the input and output relationship, and supplies the third information to the goal state setting unit, and the goal state setting unit sets the goal state based on the first information, the second information, and the third information, and sets a new previously unlearned goal state for a new learning operation once the goal state is successfully achieved.

11. The learning control apparatus according to claim 1, wherein the evaluation unit modifies the goal state based on the first information, the second information, and the third information if the accuracy of all of the prediction calculated by the means for predicting, the index calculated by the means for planning, and the progress of the learning calculated by the means for controlling are sufficient.

12. The learning control apparatus according to claim 1, wherein the new task that is set is more complex than the goal state that has been achieved.

* * * * *